US00RE48067E

(19) United States
(12) Reissued Patent
Wu

(10) Patent Number: US RE48,067 E
(45) Date of Reissued Patent: Jun. 23, 2020

(54) METHOD, SYSTEM, AND APPARATUS FOR REGISTRATION PROCESSING

(71) Applicant: Huawei Technologies Co., Ltd., Shenzhen (CN)

(72) Inventor: Wenfu Wu, Shanghai (CN)

(73) Assignee: Huawei Technologies Co., Ltd., Shenzhen (CN)

(21) Appl. No.: 15/216,469

(22) Filed: Jul. 21, 2016

Related U.S. Patent Documents

Reissue of:
(64) Patent No.: 8,787,314
Issued: Jul. 22, 2014
Appl. No.: 13/197,537
Filed: Aug. 3, 2011

U.S. Applications:
(63) Continuation of application No. 12/581,575, filed on Oct. 19, 2009, now Pat. No. 8,537,779, which is a
(Continued)

(30) Foreign Application Priority Data

May 11, 2007 (CN) ..... 2007 1 0104400
Oct. 24, 2007 (CN) ..... 2007 1 0181758
(Continued)

(51) Int. Cl.
*H04W 4/00* (2018.01)
*H04W 12/06* (2009.01)
(Continued)

(52) U.S. Cl.
CPC ..... *H04W 12/06* (2013.01); *H04L 63/0892* (2013.01); *H04W 8/04* (2013.01); *H04W 60/04* (2013.01); *H04W 36/14* (2013.01)

(58) Field of Classification Search
CPC ..... H04W 60/04; H04W 8/04; H04W 12/06; H04W 36/14; H04L 63/0892
See application file for complete search history.

(56) References Cited

U.S. PATENT DOCUMENTS 6,246,874 B1 6/2001 Voce
6,725,039 B1 4/2004 Parmar et al.
(Continued)

FOREIGN PATENT DOCUMENTS

CH 1275872 12/2000
CH 1605222 4/2005
(Continued)

OTHER PUBLICATIONS

Huawei "Handover from non 3GPP to 3GPP", 3GPP TSG SA WG2 Document S2-071132, Mar. 21, 2007.*
(Continued)

*Primary Examiner* — Luke S Wassum
(74) *Attorney, Agent, or Firm* — Leydig, Voit & Mayer, Ltd.

(57) ABSTRACT

A registration processing method and an apparatus are disclosed herein to enable the network to distinguish between different registration processing types. The method includes: identifying, by a user equipment, UE, a registration type when registering into a network; reporting, by the UE, a registration processing type information corresponding to the identified registration type to a network-side network element during registering into the network. The UE reports the registration processing type information to the network in the process of registering into the network, and therefore, the network distinguishes between different registration processing types accordingly.

12 Claims, 16 Drawing Sheets

Related U.S. Application Data continuation of application No. PCT/CN2008/070909, filed on May 8, 2008.

(30) Foreign Application Priority Data

Nov. 2, 2007 (CN) ..... 2007 1 0165540
Mar. 13, 2008 (CN) ..... 2008 1 0085729

(51) Int. Cl.

*H04L 29/06* (2006.01)
*H04W 60/04* (2009.01)
*H04W 8/04* (2009.01)
*H04W 36/14* (2009.01)

(56) References Cited

U.S. PATENT DOCUMENTS

| | | | | |
|---|---|---|---|---|
| 7,079,499 | B1 | 7/2006 | Akhtar et al. | |
| 7,257,403 | B2 | 8/2007 | Nikkelen | |
| 7,586,878 | B2 | 9/2009 | Hsu et al. | |
| 7,764,660 | B2 | 7/2010 | Verma et al. | |
| 7,969,931 | B2 | 6/2011 | Bachmann et al. | |
| 8,031,677 | B1 * | 10/2011 | Wu | H04W 76/32 370/331 |
| 8,200,222 | B2 | 6/2012 | Kim | |
| 8,483,211 | B2 * | 7/2013 | Walker | H04W 8/04 370/352 |
| 8,537,779 | B2 * | 9/2013 | Wu | H04W 60/04 370/331 |
| 8,638,750 | B2 * | 1/2014 | Wu | H04L 47/80 370/331 |
| 8,787,314 | B2 * | 7/2014 | Wu | H04W 60/04 370/331 |
| 2003/0114158 | A1 | 6/2003 | Soderbaca et al. | H04W 36/0066 455/436 |
| 2004/0100403 | A1 | 5/2004 | Park et al. | |
| 2004/0242199 | A1 * | 12/2004 | Edlund | H04W 8/245 455/411 |
| 2005/0130659 | A1 | 6/2005 | Grech et al. | |
| 2006/0104262 | A1 | 5/2006 | Kant et al. | |
| 2006/0109817 | A1 | 5/2006 | Ramanna et al. | |
| 2006/0114871 | A1 | 6/2006 | Buckley et al. | |
| 2006/0126565 | A1 | 6/2006 | Shaheen | |
| 2006/0153124 | A1 | 7/2006 | Kant et al. | |
| 2006/0187880 | A1 | 8/2006 | Choi | |
| 2006/0221903 | A1 | 10/2006 | Kauranen et al. | |
| 2006/0258356 | A1 | 11/2006 | Maxwell et al. | |
| 2007/0019643 | A1 * | 1/2007 | Shaheen | H04W 60/00 370/389 |
| 2007/0224990 | A1 | 9/2007 | Edge et al. | |
| 2007/0243872 | A1 * | 10/2007 | Gallagher et al. | H04W 76/022 455/436 |
| 2007/0281699 | A1 * | 12/2007 | Rasanen | H04W 36/0038 455/436 |
| 2008/0089293 | A1 | 4/2008 | Madour et al. | |
| 2008/0181178 | A1 | 7/2008 | Shaheen | H04W 8/24 370/331 |
| 2008/0254768 | A1 | 10/2008 | Faccin | |
| 2008/0316971 | A1 * | 12/2008 | Shaheen | 370/331 |
| 2008/0320149 | A1 | 12/2008 | Faccin | |
| 2009/0073933 | A1 | 3/2009 | Madour | H04W 8/26 370/331 |
| 2009/0285183 | A1 * | 11/2009 | Wu | H04L 47/80 370/331 |
| 2010/0040024 | A1 * | 2/2010 | Wu | H04W 60/04 370/331 |
| 2010/0246533 | A1 * | 9/2010 | Lundin | H04W 36/0066 370/332 |
| 2011/0292913 | A1 | 12/2011 | Wu | |
| 2014/0295845 | A1 | 10/2014 | Parmar et al. | |

FOREIGN PATENT DOCUMENTS

| | | | |
|---|---|---|---|
| CH | 1882160 | | 12/2006 |
| CN | 1275872 | A | 12/2000 |
| CN | 1549610 | A | 11/2004 |
| CN | 1605222 | A | 4/2005 |
| CN | 1866850 | A | 11/2006 |
| CN | 1882160 | A | 12/2006 |
| CN | 101431797 | B | 2/2012 |
| EP | 1619916 | B1 | 2/2007 |
| EP | 1758264 | A2 | 2/2007 |
| WO | 2004100403 | A1 | 11/2004 |
| WO | 2006012909 | A1 | 2/2006 |
| WO | 2007011638 | A2 | 1/2007 |
| WO | 2007011638 | A3 | 1/2007 |
| WO | 2007024115 | A1 | 3/2007 |
| WO | 2007036764 | A1 | 4/2007 |
| WO | 2007038947 | A1 | 4/2007 |
| WO | 2008094419 | A1 | 8/2008 |
| WO | 2008138259 | A1 | 11/2008 |

OTHER PUBLICATIONS

Qualcomm Europe "Information Flows for Handover Between 3GPP and non-3GPP Accesses", 3GPP TSG SA WG2 Document S2-071148, Mar. 21, 2007.*

Samsung "Analysis of HO Procedure Between LTE and Trusted non-3GPP System", 3GPP TSG SA WG2 Document S2-071290, Mar. 21, 2007.*

Telecon Italia "AAA Impacts on Inter-System Handover Latency", 3GPP TSG SA WG2 Document S2-071338, Mar. 21, 2007.*

Panasonic "3GPP to non-3GPP Handover", 3GPP TSG SA WG2 Document S2-071431, Mar. 21, 2007.*

Samsung "Security Context Transfer for Handover Between 3GPP and Trusted non 3GPP Networks", 3GPP TSG SA WG2 Document S2-071437, Mar. 21, 2007.*

3GPP "3GPP TS 23.401 V0.4.0 GPRS Enhancements for E-UTRAN Access, Release 8", Apr. 13, 2007.*

Huawei, CMCC, CATT, RITT, ZTE "PDN Gateway Selection", 3GPP TSG SA WG2 Document S2-071688, Apr. 18, 2007.*

Huawei "Refine Attach Procedure", 3GPP TSG SA WG2 Document S2-071691, Apr. 18, 2007.*

Huawei "Storage of PDN GW During Handover from non 3GPP to 3GPP", 3GPP TSG SA WG2 Document S2-071700, Apr. 18, 2007.*

Huawei "Handover from non 3GPP to 3GPP", 3GPP TSG SA WG2 Document S2-071701, Apr. 18, 2007.*

Ericsson "GW Selection for LTE and non-3GPP Accesses", 3GPP TSG SA WG2 Document S2-071738, Apr. 18, 2007.*

Azaire Networks "EUTRAN—Untrusted non-3GPP Access Networks Handovers", 3GPP TSG SA WG2 Document S2-071874, Apr. 18, 2007.*

NTT DoCoMo "Proposal on 3GPP—non 3GPP Handover Procedure", 3GPP TSG SA WG2 Document S2-071906, Apr. 18, 2007.*

Starent, Marvell, Sprint, KDDI "Handover Scenarios Between 3GPP (EUTRA) and non-3GPP Access Systems Using S2a Reference Point with PMIP6", 3GPP TSG SA WG2 Document S2-072099, Apr. 24, 2007.*

Starent, Sprint "Handover Scenarios Between 3GPP (EUTRA) and nbon-3GPP Access Systems Using S2a Reference Point with CMIP4", 3GPP TSG SA WG2 Document S2-072100, Apr. 24, 2007.*

Starent, Sprint "Handover Scenarios Between 3GPP (E-UTRAN) and non-3GPP Access Systems Using S3c Reference Point", 3GPP TSG SA WG2 Document S2-072110, Apr. 25, 2007.*

Intel "Handover from 3GPP Access (UTRAN) to non-3GPP Access (TS 23.402)", 3GPP TSG SA WG2 Document S2-072202, Apr. 26, 2007.*

Motorola "Handover from nn-3GPP Access to E-UTRAN (TS 23.402)", 3GPP TSG SA WG2 Document S2-072252, Apr. 27, 2007.*

Nokia Siemens Networks, Nokia "GPRS Functionality for IMS Emergency Services Support", 3GPP TSG SA WG2 Document S2-072255, Apr. 27, 2007.*

(56) References Cited

OTHER PUBLICATIONS

Nokia Siemens Networks "PDN GW Selection for LTE and non-3GPP Access", 3GPP TSG SA WG2 Document S2-072182, May 2, 2007.*
Huawei "Attach Type in Attach Procedure", 3GPP TSG SA WG2 Document S2-072558, Jun. 19, 2007.*
Wu, Wenfu "A Method, System, and Apparatus for Registration Processing", English Language Translation of Chinese Patent Publication CN2007-10181758.X, Oct. 24, 2007.*
Wu, Wenfu "A Method, System, and Apparatus for Registration Processing", English Language Translation of Chinese Patent Publication CN2007-10165540.5, Nov. 2, 2007.*
Wu, Wenfu "A Method, System, and Apparatus for Registration Processing", English Language Translation of Chinese Patent Publication CN2008-10085729.8, Mar. 13, 2008.*
International Search Report, PCT/CN2008/070909, dated Aug. 21, 2008.*
Written Opinion, PCT/CN2008/070909, dated Aug. 21, 2008.*
Motorola "Handover from non-3GPP Access to E-UTRAN (TS 23.402)", 3GPP TSG SA WG2 Architecture—S2#57 Document S2-071720, Apr. 18, 2007. (Year: 2007).*
3GPP.org "Directory Listing of /ftp/tsg_sa/wg2_arch/tsgs2_57_beijing/Docs", 2007, downloaded from http://www.3gpp.org/ftp/tsg_sa/wg2_arch/tsgs2_57_beijing/Docs/ on Dec. 11, 2018. (Year: 2007).*
"*T-Mobile US, Inc. and T-Mobile USA, Inc., Petitioner*, v. *Huawei Technoglogies Co. Ltd., Patent Owner.*," Case IPR2017-00671, U.S. Pat. No. 8,638,750 B2, Decision Institution of Inter Partes Review 35 U.S.C. § 314(a) and 37 C.F.R. § 42.108, (Jul. 31, 2017).
"*T-Mobile US, Inc. and T-Mobile USA, Inc., Petitioner*, v. *Huawei Technologies Co. Ltd., Patent Owner.*," Cases IPR2017-00671, U.S. Pat. No. 8,638,750 B2, Scheduling Order 37 C.F.R. § 42.5(a), (Jul. 31, 2017).
"*Nokia Solutions and Networks US LLC, and Nokia Solutions and Netwrks OY, Petitioner*, v. *Huawei Technologies Co. Ltd, Patent Owner.*," Case IPR2017-00658, U.S. Pat. No. 8,537,779 B2, Decision Denying Institution of Inter Partes Review 37 C.F.R. § 42.108, (Jul. 28, 2017).
"Petition for Inter Partes Review of U.S. Pat. No. 8,638,750 Under 35 U.S.C. § 312 and 37 C.F.R. § 42.104; *T-Mobile US, Inc. and T-Mobile USA, Inc. Petitioners* v. *Patent Owner* of U.S. Pat. No. 8,638,750 to Wu et al.; Trial No. IPR2017-00671," (Jan. 19, 2017).
"NSN Invalidity Contentions (16-cv-00056); Exhibit A-1, S2-072252; *Handover from non-3GPP Access to E-UTRAN* (TS 2a402), Motorola, 3GPP TSG SA WG2 S2#47, Apr. 23-27, 2007 ("S2-072252")," (Aug. 11, 2016).
"NSN Invalidity Contentions (16-cv-00056); Exhibit A-2; U.S. Pat. No. 8,537,779 ("the '779")," (Aug. 11, 2016).
"NSN Invalidity Contentions (16-cv-00056); Exhibit A-3; U.S. Application No. 2005/0130659 to Grech et al. ("Grech et al.")," (Aug. 11, 2016).
"NSN Invalidity Contentions (16-cv-00056); Exhibit B-1; U.S. Pat. No. 7,586,878 to Hsu et al. ("Hsu et al.")," (Aug. 11, 2016).
"NSN Invalidity Contentions (16-cv-00056); Exhibit B-2; U.S. Pat. No. 8,638,750 ("The '750")," (Aug. 11, 2016).
"NSN Invalidity Contentions (16-cv-00056); Exhibit B-3; S2-072252, *Handover from non-3GPP Access to E-UTRAN* (TS 23.402), Motorola, 3GPP TSG SA WG2 S2#47, Apr. 23-27, 2007 ("S2-072252")," (Aug. 11, 2016).
"NSN Invalidity Contentions (16-cv-00056); Exhibit B-4; Prior Art Standard 3GPP TS 23.401v1.0.0 & 3GPP TS 23.402v1.0.0 (collectively, the "Prior Art Standard")," (Aug. 11, 2016).
"NSN Invalidity Contentions (16-cv-00056); Exhibit B-5; Yu-Ching Hsu and Pai-Feng Tsai, A Practical Mechanism for Vertical Handoff in WLAN/3G Integrated Networks ("Hsu and Tsai")," (Aug. 11, 2016).
"T-Mobile NSN P.R. 3-3 Invalidity Contentions; Defendants T-Mobile US, Inc. and T-Mobile USA, Inc.'s and Intervenors Nokia Solutions and Networks US LLC and Nokia Solutions and Networks OY's P.R. 3-3 Invalidity Contentions," (Aug. 11, 2016).
"T-Mobile US, Inc. Power of Attorney Under 37 C.F.R. § 42.10," (Jan. 18, 2017).
"T-Mobile USA, Inc. Power of Attorney Under 37 C.F.R. §42.10," (Jan. 18, 2017).
"*T-Mobile US, Inc. and T-Mobile USA, Inc. Petitioners* v. *Patent Owner* of U.S. Pat. No. 8,638,750 to Wu et al.; Declaration of Sundeep Rangan, Ph.D," (Jan. 18, 2017).
"Handover from non-3GPP Access to E-UTRAN (TS 23.402)," 3GPP TSG SA WG2 Architecture-S2#57, S2-072252, 3rd Generation Partnership Project, Valbonne, France (Apr. 23-27, 2007).
"Handover from non 3GPP to 3GPP," 3GPP TSG SA WG2 Architecture- S2#56c Rel-8 Ad-hoc, S2-071132, 3rd Generation Partnership Project, Valbonne, France (Mar. 26-30, 2007).
"Handover Scenarios between 3GPP (EUTRA) and non-3GPP Access systems using S2a Reference Point with PMIP6," 3GPP TSG SA WG2 Architecture-S2#57, S2-072099, 3rd Generation Partnership Project, Valbonne, France (Apr. 23-27, 2007).
"Change Request; GPRS functionality for IMS emergency services support," 3GPP TSG-SA2 Meeting #57, Beijing China, S2-072255, 3rd Generation Partnership Project, Valbonne, France (Apr. 23-27, 2007).
"www.3gpp.org-/ftp/tsg_sa/WG2_Arch/TSGS2_57_Beijing/Docs/," (Downloaded Jul. 14, 2016).
"*T-Mobile US, Inc. and T-Mobile USA Inc. Petitioners* v. *Patent Owner* of U.S. Pat. No. 8,638,750 to Wu et al.; Declaration of Craig Bishop," (Jan. 13, 2017).
"www.3gpp.org-/ftp/tsg_sa/WG2_Arch/TSGS2_56c-AHWarsaw/Docs/," (Downloaded Jul. 14, 2016).
"PDN GW selection for LTE and non-3GPP access," 3GPP TSG SA WG2 Architecture-S2#57, Beijing, China, S2-072182, 3rd Generation Partnership Project, Valbonne, France (Apr. 23-27, 2007).
"3rd Generation Partnership Project; Technical Specification Group Services and System Aspects; GPRS enhancements for E-UTRAN access (Release 8)," 3GPP TS 23.401, V1.0.0, pp. 1-50, 3rd Generation Partnership Project, Valbonne, France (May 2007).
"3rd Generation Partnership Project; Technical Specification Group Services and System Aspects; Architecture Enhancements for non-3GPP accesses (Release 8)," 3GPP TS 23.402, V1.0.0, pp. 1-50, 3rd Generation Partnership Project, Valbonne, France (May 2007).
"PDN Gateway selection," 3GPP TSG SA WG2 Architecture-S2#57, Beijing, China, S2-071688, 3rd Generation Partnership Project, Valbonne, France (Apr. 23-27, 2007).
"GW selection for LTE and non-3GPP accesses," 3GPP TSG SA WG2 Architecture-S2#57, Beijing, China, S2-071738, 3rd Generation Partnership Project, Valbonne, France (Apr. 23-27, 2007).
"Amendment and response from File History of U.S. Pat. No. 8,638,750," dated Aug. 9, 2012.
"Office Action from File History of U.S. Pat. No. 8,638,750," dated Apr. 24, 2013.
"Amendment and response from File History of U.S. Pat. No. 8,638,750," dated Jul. 23, 2013.
"Notice of Allowance and Examiner Interview Summary from File History of U.S. Pat. No. 8,638,750," dated Sep. 12, 2013.
"3GPP FAQs," the Mobile Broadband Standard; GPRS, 3GPP (Downloaded Aug. 3, 2016).
"3GPP News; Delegates Corner," The Mobile Broadband Standard, 3GPP (Published no later than Jul. 12, 2017).
"www.3gpp.org-/ftp/Specs/archive/23_series/23.401/," (Downloaded Aug. 1, 2016).
"www.3gpp.org-/ftp/Specsarchive23_series/23.402/," (Downloaded Aug. 8, 2016).
"Report of SA WG2 meeting #57," 3GPP TSG SA WG2 Architecture—S2#57, Beijing, China, Draft Report, pp. 1-10, 3rd Generation Partnership Project, Valbonne, France (Apr. 23-27, 2007).
"Draft Report of SA WG2 ad-hoc meeting #56c," 3GPP TSG SA WG2 Architecture-S2#56c Rel-8 Ad-hoc, Warsaw, Poland, Draft Report, 3rd Generation Partnership Project, Valbonne, France (Mar. 26-30, 2007).
"Joint Claim Construction Chart; Exhibit A," (Dec. 8, 2016).
"File History of U.S. Pat. No. 8,537,779," (Published no later than Jul. 12, 2017).

(56) References Cited

OTHER PUBLICATIONS

"*Nokia Solutions and Networks US LLC; and Nokia Solutions and Networks OY, Petitioners* v. *Huawei Technologies Co. Ltd., Patent Owner*; Petitioners' Exhibit No. NSN779-1003; Declaration of Mark Lanning," (Jan. 19, 2017).
"*Nokia Solutions and Networks US LLC; and Nokia Solutions and Networks OY, Petitioners* v. *Huawei Technologies Co. Ltd., Patent Owner*; Petitioners' Exhibit NSN799-1004; Declaration of Balazs Bertenyi," (Jan. 10, 2017).
"Newton's Telecom Dictionary; The Authoritative Resource for Telecommunications, Networking, the Internet and Information Technology," p. 373, CMP Books, New York, New York (Feb. 2002).
"*Huawei Technologies Co. Ltd.*, Plaintiff v. *T-Mobile US, Inc. and T-Mobile USA, Inc.*, Defendants; Original Complaint for Patent Infringement," (Jan. 15, 2016).
"Handover from non-3GPP Access to E-UTRAN (TS 23.402)," 3GPP TSG SA WG2 Architecture- S2#57, Beijing, China, S2-072252, 3rd Generation Partnership Project, Valbonne, France (Apr. 23-27, 2007).
"Report of SA WG2 meeting #57," 3GPP TSG SA WG2 Architecture—S2#57, Beijing, China, Draft Report, pp. 1-89, 3rd Generation Partnership Project, Valbonne, France (Apr. 23-27, 2007).
"3GPP Meeting Registration; List of Registered Attendees," (Jan. 9, 2017).
"Attach Type in attach procedure," 3GPP TSG SA WG2 Architecture—52#58, Orlando, Florida, S2-072558, 3rd Generation Partnership Project, Valbonne, France (Jun. 25-29, 2007).
"Principle of differentiating Initial Attach and Handover Attach to EPS via LTE or non-3GPP IP Access," 3GPP TSG SA WG2 Meeting #61, Ljubljana, Slovenia, TD S2-075847, 3rd Generation Partnership Project, Valbonne, France (Nov. 12-16, 2007).
"About 3GPP Home," The Mobile Broadband Standard, 3GPP (Downloaded Jan. 10, 2017).
"Delegates Corner; Information about TSGs or WGs," The Mobile Broadband Standard, UMTS, 3GPP (Downloaded Jan. 10, 2017).
"3GPP FAQs," The Mobile Broadband Standard, 3GPP (Downloaded Sep. 22, 2016).
"www.3gpp.org-/ftp/tsg_sa/WG2_Arch/TSGS2_57_Beijing/Docs/," (Downloaded Jan. 9, 2017).
"3rd Generation Partnership Project; Technical Specification Group Services and System Aspects; General Packet Radio Service (GPRS); Service description; Stage 2 (Release 4)," 3GPP TS 23.060, V4.6.0, pp. 1-201, 3rd Generation Partnership Project, Valbonne, France (Sep. 2002).
"3rd Generation Partnership Project; Technical Specification Group Services and System Aspects; 3GPP System Architecture Evolution: GPRS enhancements for E-UTRAN access; Release 8," 3GPP TS 23.401, V0.4.1, pp. 1-41, 3rd Generation Partnership Project, Valbonne, France (Apr. 2007).
"*Huawei Technologies Co. Ltd.*, Plaintiff, v. *T-Mobile US, Inc. and T-Mobile USA, Inc.*, Defendants, Nokia Solutions and Networks US LLC, Nokia Solutions and Networks OY, Telefonaktiebolaget LM Ericsson, and Ericsson Inc., Intervenors; Joint Claim Construction and Prehearing Statement," (Dec. 8, 2016).
"Curriculum Vitae; Mark R. Lanning," (Published no later than Jul. 12, 2017).
"*Cassidian Communications, Inc.*, Plaintiff, v. *Microdata Gis, Inc.*, Defendants; Memorandum Opinion and Order," (Jun. 20, 2013).
"*Lextron Systems, Inc.*, Plaintiff, v. *Microsoft Corp.*, Defendant," (Jun. 1, 2005).
"3rd Generation Partnership Project; Technical Specification Group Core Network and Terminals; Mobile radio interface Layer 3 specification; Core network protocols; Stage 3 (Release 7)," 3GPP TS 24.008, V7.7.0, pp. 1-546, 3rd Generation Partnership Project, Valbonne, France (Mar. 2007).
"3rd Generation Partnership Project; Technical Specification Group Services and System Aspects; Technical Specification Group working methods (Release 5)," 3GPP TR 21.900, V6.0.0, pp. 1-33, 3rd Generation Partnership Project, Valbonne, France (Sep. 2003).
*Nokia Solutions and Networks US LLC; and Nokia Solutions and Networks OY, Petitioners* v. *Huawei Technologies Co. Ltd., Patent Owner*; Petition for Inter Partes Review Under 35 U.S.C. §312 and 37 C.F.R. §42.104 (Jan. 20, 2017).
Office Action issued in corresponding U.S. Appl. No. 13/197,537, dated Jun. 27, 2013, 18 pages.
Office Action issued in commonly owned U.S. Appl. No. 13/197,537, dated Dec. 18, 2012.
Notice of Allowance issued in commonly owned U.S. Appl. No. 12/581,575, dated May 23, 2013.
Office Action issued in commonly owned U.S. Appl. No. 12/581,575, dated Nov. 15, 2010.
Office Action issued in commonly owned U.S. Appl. No. 12/581,575, dated Apr. 25, 2011.
Office Action issued in commonly owned U.S. Appl. No. 12/581,575, dated Dec. 6, 2011.
Office Action issued in commonly owned U.S. Appl. No. 12/581,575, dated May 3, 2012.
Office Action issued in commonly owned U.S. Appl. No. 12/581,575, dated Dec. 18, 2012.
"EUTRA—Untrusted non-3GPP Access Networks Handovers," 3GPP TSG SA WG2 Architecture—S2#57, Beijing, China, S2-072192, 3rd Generation Partnership Project, Valbonne, France (Apr. 23-27, 2007).
Ylianttila et al., "Optimization Scheme for Mobile Users Performing Vertical Handoffs between IEEE 802.11 and GPRS/EDGE networks," IEEE Global Telecommunications Conference, Institute of Electrical and Electronics Engineers, New York, New York (Nov. 25-29, 2001).
"PDN GW selection for LTE and non-3GPP access," 3GPP TSG SA WG2 Architecture—52#57, Beijing, China, draftS2-072084, 3rd Generation Partnership Project, Valbonne, France (Apr. 23-27, 2007).
"Handover Scenarios between 3GPP (EUTRA) and non-3GPP Access systems using S2a Reference Point with PMIP6," 3GPP TSG SA WG2 Architecture—52#57, Beijing, China, S2-071761, 3rd Generation Partnership Project, Valbonne, France (Apr. 23-27, 2007).
Falowo et al., "AAA and Mobility Management in UMTS-WLAN Interworking," Proceedings of the 12th International Conference on Telecommications, ICT2005, Cape Town, South Africa, pp. 1-6 (May 3-5, 2005).
Schmidt, "UMTS and WLAN interoperability," pp. i- G-3 (Jul. 31, 2004).
Lampropoulos et al., "Handover Management Architectures in Integrated WLAN/Cellular Networks," IEEE Communications Surveys & Tutorials, Fourth Quarter 2005, vol. 7, Issue 4, pp. 30-44, Institute of Electrical and Electronics Engineers, New York, New York (2005).
Jaseemuddin, "An Architecture for Integrating UMTS and 802.11 WLAN Networks," Proceedings of the Eighth IEEE International Symposium on computers and Communication, Institute of Electrical and Electronics Engineers, New York, New York (Jul. 2003).
Chakravorty et al., "Performance Issues with Vertical Handovers—Experiences from GPRS Cellular and WLAN Hot-spots Integration," Proceedings of the Second IEEE Conference on Pervasive Computing and Communications (PerCom'04), IEEE Computer Society, Washington, DC (2004).
"3rd Generation Partnership Project; Technical Specification Group Core Network; Digital cellular telecommunications system (Phase 2+); General Packet Radio Service (GPRS); Service description; Stage 2 (3G TS 23.060 version 3.1.0)," 3G TS 23.060, V3.1.0, pp. 1-184, 3rd Generation Partnership Project, Valbonne, France (Oct. 1999).
"3rd Generation Partnership Project; Technical Specification Group Services and System Aspects; GPRS enhancements for E-UTRAN access (Release 8)," 3GPP TS 23.401, V1.0.0, pp. 1-54, 3rd Generation Partnership Project, Valbonne, France (May 2007).
"3rd Generation Partnership Project; Technical Specification Group Services and System Aspects; Architecture Enhancements for non-3GPP accesses (Release 8)," 3GPP TS 23.402, V1.0.0, pp. 1-53, rd Generation Partnership Project, Valbonne, France (May 2007).

(56) References Cited

OTHER PUBLICATIONS

"3rd Generation Partnership Project; Technical Specification Group Services and System Aspects; 3GPP System Architecture Evolution: Architecture Enhancements for non-3GPP accesses; Release 8," 3GPP TS 23.402, V0.4.0, pp. 1-32, 3rd Generation Partnership Project, Valbonne, France (Apr. 2007).
"Information technology—Telecommunications and information exchange between systems—Local and metropolitan area networks—Specific requirements—Part 11: Wireless LAN Medium Access Control (MAC) and Physical Layer (PHY) specifications," IEEE Std. 802.11-1997, pp. i-446, Institute of Electrical and Electronics Engineers, New York, New York (1997).
Wang et al., "A Mobile IPv6 based Seamless Handoff Strategy for Heterogeneous Wireless Networks," Proceedings of the Fourth International Conference on Computer and Information Technology (CIT'04), IEEE Computer Society, Washington, DC (2004).
Ma et al., "A New Method to Support UMTS/WLAN Vertical Handover Using SCTP," Mobility and Resource Management, IEEE Wireless Communications, pp. 44-51, Institute of Electrical and Electronics Engineers, New York, New York (Aug. 2004).
Hsu et al., "A Practical Mechanism for Vertical Handoff in WLAN/3G Integrated Networks," IEEE 63rd Vehicular Technology Conference, pp. 393-396, Institute of Electrical and Electronics Engineers, New York, New York (Sep. 2006).
Kay, "Standards for Encoding Linguistic Data," The RAND Corporation, Santa Monica, California (1967).
Madden et al., "Generation of fault trees from simulated incipient fault case data," Transactions on Information and Communications Technologies, vol. 6, pp. 567-574, Southampton, England (1994).
"Report of SA WG2 meeting #57," 3GPP TSG SA WG2 Architecture—S2#57, Beijing, China, Draft Report, 3rd Generation Partnership Project, Valbonne, France (Apr. 23-27, 2007).
Kwon et al., "Consideration of UMTS-WLAN Seamless Handover," Proceedings of the Seventh IEEE International Symposium on Multimedia (ISM '05), IEEE Computer Society, Washington, D.C. (2005).
Tsao et al., "Design and Evaluation of UMTS-WLAN Interworking Strategies," pp. 777-781, Institute of Electrical and Electronics Engineers, New York, New York (2002).
"Digital Enhanced Cordless Telecommunications (DECT); Common Interface (CI); Part 4: Data Link Control (DLC) layer," Draft EN 300 175-4, V1.4.1, pp. 1-134, European Telecommunications Standards Institute, Valbonne, France (Feb. 1998).
Koodli, "Fast Handovers for Mobile IPv6," Mobile IP Working Group, Internet Draft, Internet Engineering Task Force, Fremont, California (Mar. 1, 2003).
Boole, "The Mathematical Analysis of Logic; Being an Essay Towards a Calculus of Deductive Reasoning," pp. 1-82, Philosophical Library, Inc., New York, New York (1948).
Varma et al., "Mobility Management in Integrated UMTS/WLAN Networks," pp. 1048-1053, Institute of Electrical and Electronics Engineers, New York, New York, (2003).
Atkinson et al., "The Personal Distributed Environment," IEEE Wireless Communications, pp. 62-69, Institute of Electrical and Electronics Engineers, New York, New York (Apr. 2007).
"SAE Bearer Model and QoS Concept," 3GPP TSG SA WG2 Architecture—S2#56b Rel-8 Ad-hoc, St. Louis, Missouri, 82-070713, 3rd Generation Partnership Project, Valbonne, France (Feb. 12-15, 2007).
"Handover from non 3GPP to 3GPP," 3GPP TSG SA WG2 Architecture—52#56c Rel-8 Ad-hoc, Warsaw, Poland, S2-071132, 3rd Generation Partnership Project, Valbonne, France (Mar. 26-30, 2007).
"Discussion on PDN SAE GW identity registration in HSS," 3GPP TSG SA WG2 Architecture—S2#56c Rel-8 Ad-hoc, Warsaw, Poland, S2-071209, 3rd Generation Partnership Project, Valbonne, France (Mar. 26-30, 2007).
"SAE GW resolution mechanism considering 3GPP-non3GPP mobility," 3GPP TSG SA WG2 Architecture—52#56c Rel-8 Ad-hoc, Warsaw, Poland, S2-071262, 3rdGeneration Partnership Project, Valbonne, France (Mar. 26-30, 2007).
"Analysis of HO procedure between LTE and trusted non-3GPP system," 3GPP TSG SA WG2 Architecture—S2#56c Rel-8 Ad-hoc, Warsaw, Poland, S2-071290, 3rd Generation Partnership Project, Valbonne, France (Mar. 26-30, 2007).
"Discussion on UE radio access capabilities in SAE," 3GPP TSG SA WG2 Architecture—52#56c Rel-8 Ad-hoc, Warsaw, Poland, S2-071292, 3rd Generation Partnership Project, Valbonne, France (Mar. 26-30, 2007).
"AAA impacts on inter-system handover latency," 3GPP TSG SA WG2 Architecture—S2#56c Rel-8 Ad-hoc, Warsaw, Poland, S2-071338, 3rd Generation Partnership Project, Valbonne, France (Mar. 26-30, 2007).
"Initial Attach Procedure from Evolved Ran," 3GPP TSG SA WG2 Architecture—S2#56c Rel-8 Ad-hoc, Warsaw, Poland, S2-071339, 3rd Generation Partnership Project, Valbonne, France (Mar. 26-30, 2007).
"SAE GW Resolution," 3GPP TSG SA WG2 Architecture—52#56c Rel-8 Ad-hoc, Warsaw, Poland, S2-071419, 3rd Generation Partnership Project, Valbonne, France (Mar. 26-30, 2007).
"3GPP to non-3GPP handover," 3GPP TSG SA WG2 Architecture—S2#56c Rel-8 Ad-hoc, Warsaw, Poland, S2-071431, 3'Generation Partnership Project, Valbonne, France (Mar. 26-30, 2007).
"Security context transfer for handover between 3GPP and trusted non3GPP networks," 3GPP TSG SA WG2 Architecture—52#56c, Warsaw, Poland, S2-071437, 3rd Generation Partnership Project, Valbonne, France (Mar. 26-30, 2007).
"S2a Initial Attach Procedure," 3GPP TSG SA WG2 Architecture—S2#56c Rel-8 Ad-hoc, Warsaw, Poland, S2-071166, 3rd Generation Partnership Project, Valbonne, France (Mar. 26-30, 2007).
"Initial LTE attachment via 58b," 3GPP TSG SA WG2 Architecture—52#57, Beijing, China, S2-071697, 3rd Generation Partnership Project, Valbonne, France (Apr. 2007).
"Storage of PDN G2 during Handover from non 3GPP to 3GPP," 3GPP TSG SA WG2 Architecture—52#57, Beijing, China, S2-071700, 3rd Generation Partnership Project, Valbonne, France (Apr. 23-27, 2007).
"Handover from non 3GPP to 3GPP," 3GPP TSG SA WG2 Architecture—S2#57, Beijing, China, S2-071701, 3rd Generation Partnership Project, Valbonne, France (Apr. 23-27, 2007).
"PDN GW Selection," 3GPP TSG SA WG2 Architecture-S2#57, Beijing, China, S2-071873, 3rd Generation Partnership Project, Valbonne, France (Apr. 23-27, 2007).
"Allocation of PDN-GW Selection Function," 3GPP TSG SA WG2 Architecture—S2#57, Beijing, China, S2-071935, 3rd Generation Partnership Project, Valbonne, France (Apr. 23-27, 2007).
"Handover Scenarios between 3GPP (EUTRA) and non-3GPP Access systems using S2a Reference Point with PMIP6," 3GPP TSG SA WG2 Architecture—S2#57, Beijing, China, S2-072099, 3rd Generation Partnership Project, Valbonne, France (Apr. 23-27, 2007).
"Handover from non-3GPP Access to E-UTRAN (TS 23.402)," 3GPP TSG SA WG2 Architecture—S2#57, Beijing, China, S2-072108, 3rd Generation Partnership Project, Valbonne, France (Apr. 23-27, 2007).
"Mobility between 3GPP and un-trusted non-3GPP accesses using S2c," 3GPP TSG SA WG2 Architecture—S2#57, Beijing, China, S2-072109, 3rd Generation Partnership Project, Valbonne, France (Apr. 23-27, 2007).
"Selection and Retrieval of P-GW location for non-3GPP Accesses," 3GPP TSG SA WG2 Architecture—S2#57, Beijing, China, S2-072111, 3rd Generation Partnership Project, Valbonne, France (Apr. 23-27, 2007).
"Principles for handover between 3GPP and non-3GPP accesses," 3GPP TSG SA WG2 Architecture—S2#57, Beijing, China, S2-072188, 3rd Generation Partnership Project, Valbonne, France (Apr. 23-27, 2007).
"Handover Scenarios between 3GPP and Untrusted non-3GPP Access systems using S2c Reference Point," 3GPP TSG SA WG2 Architecture—S2#57, Beijing, China, S2-072200, 3rd Generation Partnership Project, Valbonne, France (Apr. 23-27, 2007).

(56) References Cited

OTHER PUBLICATIONS

"Handover from 3GPP Access (UTRAN) to non-3GPP Access (TS 23.402)," 3GPP TSG SA WG2 Architecture—S2#57, S2-072202, 3rd Generation Partnership Project, Valbonne, France (Apr. 23-27, 2007).
"Handover from non-3GPP Access to E-UTRAN (TS 23.402)," 3GPP TSG WG2 Architecture—S2#57, Beijing, China, S2-072252, 3rd Generation Partnership Project, Valbonne, France (Apr. 23-27, 2007).
"GPRS functionality for IMS emergency services support," 3GPP TSG-SA2 Meeting #57, Beijing, China, S2-072255, 3rd Generation Partnership Project, Valbonne, France (Apr. 23-27, 2007).
"Handover from non-3GPP Access to E-UTRAN (TS 23.402)," 3GPP TSG SA WG2 Architecture—S2#57, Beijing, China, S2-072296, 3rd Generation Partnership Project, Valbonne, France (Apr. 23-27, 2007).
Parikh et al., "Seamless handoff of Mobile Terminal from WLAN to cdma2000 Network," (Jan. 2003).
Stein, "Survey of IEEE802.21 Media Independent Handover Services," pp. 1-16, http://userfs.cec.wustl.edu/~jws2/mihs/index.html (Apr. 24, 2006).
Frantti et al., "Efficient wireless networking with advanced services and negotiated QoS," VTT Electronics, Espoo, Finland (2004).
"Digital cellular telecommunications system (Phase 2+); Universal Mobile Telecommunications System (UMTS); General Pack Radio Service (GPRS) Service description; Stage 2 (3GPP TS 23.060 version 4.8.0 Release 4)," ETSI TS 123 060, V4.8.0, pp. 1-201, European Telecommunications Standards Institute, Valbonne, France (Jun. 2003).
Orgass et al., "A base for a mobile programming system," Communications of the ACM, vol. 12, Issue 9, pp. 507-510 (Sep. 1969).
"*Nokia Solutions and Networks US LLC; and Nokia Solutions and Networks Oy, Petitioners* v. *Huawei Technologies Co. Ltd., Patent Owner*; Declaration of Mr. Scott Andrew Denning," Case: IPR2017-00658, U.S. Pat. No. 8,537,779, Exhibit 2001 (May 1, 2017).
www.3gpp.org/ftp/tsg_sa/WG2_arch/TSGS2_57_Beijing/Docs/, IPR 2017-00658, Exhibit 2002 (Downloaded Mar. 26, 2017), Internet Archive Wayback Machine Screenshot.
"Patent Law of the People's Republic of China," IPR 2017-00658, Exhibit 2003, (2000).
"*Nokia Solutions and Networks US LLC; and Nokia Solutions and Networks Oy, Petitioners* v. *Huawei Technologies Co. Ltd., Patent Owner*; Patent Owner Huawei Technologies' Preliminary Response," Case: IPR2017-00658, U.S. Pat. No. 8,537,779 (May 1, 2017).
"*T-Mobile US, Inc. and T-Mobile USA, Inc., Petitioners* v. *Huawei Technologies Co. Ltd., Patent Owner*; Declaration of Mr. Scott Andrew Denning," Case: IPR2017-00671, U.S. Pat. No. 8,638,750, Exhibit 2001 (May 1, 2017).
www.3gpp.org/ftp/tsg_sa/WG2_Arch/TSGS2_57_Beijing/Docs/, IPR2017-00671, Exhibit 2002 (Downloaded Mar. 26, 2017), Internet Archive Wayback Machine Screenshot.
www.3gpp.org/ftp/tsg_sa/WG2_Arch/TSGS2_56c-AH-Warsaw/Docs/ IPR 2017-00671, Exhibit 2003 (Downloaded Mar. 27, 2017), Internet Archive Wayback Machine Screenshot.
"*T-Mobile US, Inc. and T-Mobile USA, Inc., Petitioners* v. *Huawei Technologies Co. Ltd., Patent Owner*; Patent Owner Huawei Technologies' Preliminary Response," Case IPR 2017-00671, U.S. Pat. No. 8,638,750 (May 1, 2017).
"3rd Generation Partnership Project; Technical Specification Group Services and System Aspects; General Packet Radio Service (GPRS); Service description,"Stage 2 (Release 6) 3GPP TS 23.060, V6.9.0, Generation Partnership Project, Valbonne France (Jun. 2005).
"3rd Generation Partnership Project; Technical Specification Group Services and System Aspects; 3GPP System Architecture Evolution; Report on Technical Options and Conclusions," (Release 7) 3GPP TR 23.882, V1.5.0, 3rd Generation Partnership Project, Valbonne France (Nov. 2006).
"Attach Type in Attach Procedure Discussion /Approval", 3GPP TSG SA WG2 Architecture—S2#58, S2-072558, Orlando, Florida, 3rd Generation Partnership Project, Valbonne, France (Jun. 25-29, 2007).
"Attach Type for 3GPP accesses and Incorporation of MIPv4 into Non-3GPP-to-EUTRAN Handover," Change Request, 23.402 CR 0158. 3GPP TSG-SA WG2 Meeting #63, Athens, Greece,S2-081922, 3rd Generation Partnership Project, Valbonne, France (Feb. 18-22, 2008).
"GPRS Attach Type While in DTM," 3GPP TSG-CN1 Meeting #37, Sydney, Australia, Change Request, N1-050367, 3rd Generation Partnership Project, Valbonne, France (Feb. 14-18, 2005).
"Refine Attach Procedure," 3GPP TSG SA WG2 Architecture—S2#57, Beijing, China, S2-071691, 3rd Generation Partnership Project, Valbonne, France, (Apr. 23-27, 2007).
"TAU Procedure" 3GPP TSG SA WG2 Architecture—S2#57, Beijing, China, S2-071772,3rd Generation Partnership Project, Valbonne, France, (Apr. 23-27, 2007).
"IWLAN to GPRS Mobility Using SGSN to TTG Context Transfer," 3GPP TSG SA WG2 Architecture—S2#57, Beijing, China, S2-071760, 3rd Generation Partnership Project, Valbonne, France (Apr. 23-27, 2007).
U.S. Appl. No. 13/197,537, filed Aug. 3, 2011.
U.S. Appl. No. 12/581,575, filed Oct. 19, 2009.
"Modifications for PS HO in A/Gb mode," 3GPP TSG CT Meeting #28, Change Request 24.008 CR 992,Current version: 6.8.0, Quebec, Canada, CP-050126, pp. 1-38, 3rd Generation Partnership Project, Valbonne, France (Jun. 1-3, 2005).
"GW selection for LTE and non-3GPP accesses," 3GPP TSG SA WG2 Architecture—52#57, Beijing, China, S2-071738, pp. 1-18, 3rd Generation Partnership Project, Valbonne, France (Apr. 23-27, 2007).
"PDN GW Selection," 3GPP TSG SA WG2 Architecture—S2#57, Beijing, China, S2-071873, pp. 1-2, 3rd Generation Partnership Project, Valbonne, France (Apr. 23-27, 2007).
"PDN GW selection for LTE and non-3GPP access," 3GPP TSG SA WG2 Architecture—S2#57, S2-072182, Beijing, China, pp. 1-2, 3rd Generation Partnership Project, Valbonne, France (Apr. 23-27, 2007).
"Handover Scenarios between 3GPP and Untrusted non-3GPP Access systems using S2c Reference Point," 3GPP TSG SA WG2 Architecture—S2#57, S2-072294(e-mail rev7 of S2-072200), Beijing, China, pp. 1-5, 3rd Generation Partnership Project, Valbonne, France (Apr. 23-27, 2007).
"3rd Generation Partnership Project; Technical Specification Group Services and System Aspects; Feasibility Study of Mobility between 3GPP-WLAN Interworking and 3GPP Systems (Release 8)," 3GPP TR 23.937 V 0.0.2, pp. 1-17, 3rd Generation Partnership Project, Valbonne, France (Mar. 2007).
Office Action issued in corresponding Chinese Patent Application No. 200810085729.8, mailed Apr. 26, 2011.
Office Action issued in corresponding Chinese Patent Application No. 200810085729.8, mailed Aug. 1, 2011.
Communication issued in corresponding European Patent Application No. 08734264.8, mailed Mar. 14, 2011.
Second Office Action issued in corresponding Chinese Patent Application No. 200810085729.8, mailed Oct. 18, 2010.
Extended European Search Report issued in corresponding European Patent Application No. 10167471.1, mailed Oct. 12, 2010.
Huawei, "Handover From No. 3GPP to 3GPP Approval/Discussion", 3GPP TSG SA WG2 Architecture—S2#57. Beijing, China, Apr. 23-27, 2007.
Huawei, "Attach Type in Attach Procedure Discussion /Approval", 3GPP TSG SA WG2 Architecture—S2#58. Orlando, Florida, Jun. 25-29, 2007.
Change Request, 23.402 CR 0158. 3GPP TSG-SA WG2 Meeting #63. Athens, Greece, Feb. 18-22, 2008.
3rd Generation Partnership Project; Technical Specification Group Services and System Aspects; 3GPP System Architecture Evolution: GPRS Enhancements for E-UTRAN Access; Release 8 Global System for Mobile Communications. Apr. 2007. (clean version).
3rd Generation Partnership Project; Technical Specification Group Services and System Aspects; 3GPP System Architecture Evolution:

(56) References Cited

OTHER PUBLICATIONS

GPRS Enhancements for E-UTRAN Access; Release 8 Global System for Mobile Communications. Apr. 2007. (marked-up version).
Infineon Technologies "GPRS Attach Type While in DTM" $3_{rd}$ Generation Partnership Project (3GPP), Mobile Competence Centre. Feb. 21, 2005.
Huawei "Refine Attach Procedure" $3_{rd}$ Generation Partnership Project (3GPP), Mobile Competence Centre. Apr. 18, 2007.
Huawei "Handover from non 3GPP to 3GPP" $3_{rd}$ Generation Partnership Project (3GPP), Mobile Competence Centre. Apr. 18, 2007.
CATT "TAU Procedure" $3_{rd}$ Generation Partnership Project (3GPP), Mobile Competence Centre. Apr. 18, 2007.
Intel "Handover from 3GPP Access (UTRAN) to non-3GPP Access (TS 23.402)" $3_{rd}$ Generation Partnership Project (3GPP), Mobile Competence Centre. Apr. 19, 2007.
Huawei "Attach Type in Attach Procedure" $3_{rd}$ Generation Partnership Project (3GPP) Mobile Competence Centre. Jun. 19, 2007.
International Preliminary Report on Patentability issued in corresponding PCT Application No. PCT/CN2008/070909; issued Nov. 17, 2009.
Office Action issued in corresponding Chinese Patent Application No. 200810085729.8; issued Apr. 2, 2010.
Supplementary European Search Report issued in corresponding European Patent Application No. 08 73. 4264; issued Feb. 19, 2010.
Extended European Search Report issued in corresponding European Patent Application No. 11176895.8, mailed Nov. 21, 2011.
Office Action issued in commonly owned U.S. Appl. No. 12/581,575, mailed May 3, 2012.
Office Action issued in corresponding Chinese Patent Application No. 201110412187.2, mailed Feb. 5, 2013.
GSM, "$3^{rd}$ Generation Partnership Project; Technical Specification Group Services and System Aspects; General Packet Radio Service (GPRS); Service description" Stage 2 (Release 6) 3GPP TS 23.060, V6.9.0, Jun. 2005, 211 pages.
GSM, "$3^{rd}$ Generation Partnership Project; Technical Specification Group Services and System Aspects; 3GPP System Architecture Evolution; Report on Technical Options and Conclusions" (Release 7) 3GPP TR 23.882, V1.5.0, Nov. 2006, 167 pages.
GSM, "$3^{rd}$ Generation Partnership Project; Technical Specification Group Services and System Aspects; 3GPP System Architecture Evolution; Architecture Enhancements for non-3GPP accesses" Release 8, 3GPP TS 23.402. V0.4.0, Apr. 2007, 30 pages.
Qualcomm Europe, Samsung, Motorola, "Principles for handover between 3GPP and non-3GPP accesses" Agenda Item 8.4.3, 3GPP TSG SA WG2 Architecture—S2#57, Beijing, China, Apr. 23-27, 2007, 1 page.

* cited by examiner

METHOD, SYSTEM, AND APPARATUS FOR REGISTRATION PROCESSING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 12/581,575, filed on May 8, 2008, which is a continuation of International Application No. PCT/CN2008/070909, filed on May 8, 2008. The International Application claims priority to Chinese Patent Application No. 200710104400.7, filed on May 11, 2007, Chinese Patent Application No. 200710181758.X, filed on Oct. 24, 2007, Chinese Patent Application No. 200710165540.5, filed on Nov. 2, 2007 and Chinese Patent Application No. 200810085729.8, filed on Mar. 13, 2008. The afore-mentioned patent applications are hereby incorporated by reference in their entireties.

FIELD OF THE DISCLOSURE

The present disclosure relates to the communication field, and in particular, to a registration processing method, a handover processing method, a system, and an apparatus.

BACKGROUND

In order to enhance the competitiveness of the future networks, the Third Generation Partnership Project (3GPP) is researching a new evolved network. A requirement of the evolved network is to implement handover between a 3GPP access system (such as GERAN, UTRAN, or E-UTRAN) and a non-3GPP access system (such as a WLAN or WiMax). In the existing protocol, the handover procedure is implemented via Attach or Tracking Area Update (TAU) procedure by the UE in a new access system.

In the process of developing the present disclosure, the inventor finds that the processing mechanism of an Attach or TAU process caused by handover differs sharply from the processing mechanism of a normal Attach/TAU process: In a normal Attach process, the network needs to delete all bearers previously created by the user, create a default bearer between the UE and the Packet Data Network Gateway (PDN GW), and register the PDN GW address used by the UE into a Home Subscriber Server (HSS); but in an Attach process caused by handover, the network needs to re-create all bearers previously created by the user. In the normal TAU process, the network does not handle the bearers of the user, but in the TAU process caused by handover, the network needs to recreate all bearers previously created by the user.

In the normal handover between a 3GPP system and a non-3GPP system, the UE is disconnected from the source Access Network (AN) first, and then the UE accesses the target access network through an Attach process. Consequently, the interruption of the UE service is long, which influence the service experience of the user. Therefore, an optimized handover mechanism is adopted for handover between an Evolved UMTS Terrestrial Radio Access Network (E-UTRAN) network and a High Rate Packet Data (HRPD) access networks in Code Division Multiple Access (CDMA) network. In the optimized handover mechanism, the user plane path hands over to the target access network first before the UE hands over to the target access network (namely, while the UE is in the source access network).

In the process of developing the present disclosure, the inventor finds that the UE may hand over from an HRPD network to an E-UTRAN network in either idle state or active state. When the UE performs handover in an active state, the access network may be notified to create the bearer on the access network side in the handover process in order to speed up service recovery time after the UE hands over to the target access network. However, in the idle state, the UE runs no service and is not sensitive to handover delay. Creating bearers on the access network side when the UE is idle is a waste of the access network resources. In a pre-handover mechanism, once the UE handover fails, the UE needs to notify the PDN GW to switch the downlink path back to the source access network. Therefore, the pre-handover mechanism makes the system more complicated.

SUMMARY

A registration processing method, a handover processing method, a system, and an apparatus are disclosed in an embodiment of the present disclosure to enable the network to distinguish between different access processing types.

A registration processing method is disclosed in an embodiment of the present disclosure. The method includes: identifying, by a user equipment, UE, a registration type when registering into a network; reporting, by the UE, a registration processing type information corresponding to the identified registration type to a network-side network element during registering into the network.

A UE is disclosed in an embodiment of the present disclosure. The UE includes an identifying unit and a reporting unit. The identifying unit, configured to identify a registration type when the UE initiates the registration; a registration initiating unit, configured to initiate registration, and send a registration triggering signal. The reporting unit is configured to receive the registration triggering signal from the registration initiating unit, and report processing type information during registering the UE into the network, where the processing type information corresponds to the registration type identified by the identifying unit.

In the embodiments of the present disclosure, the UE reports the registration processing type information to the network during registering into the network, and therefore, the network distinguishes between different registration processing types accordingly.

DETAILED DESCRIPTION

Figure 1:
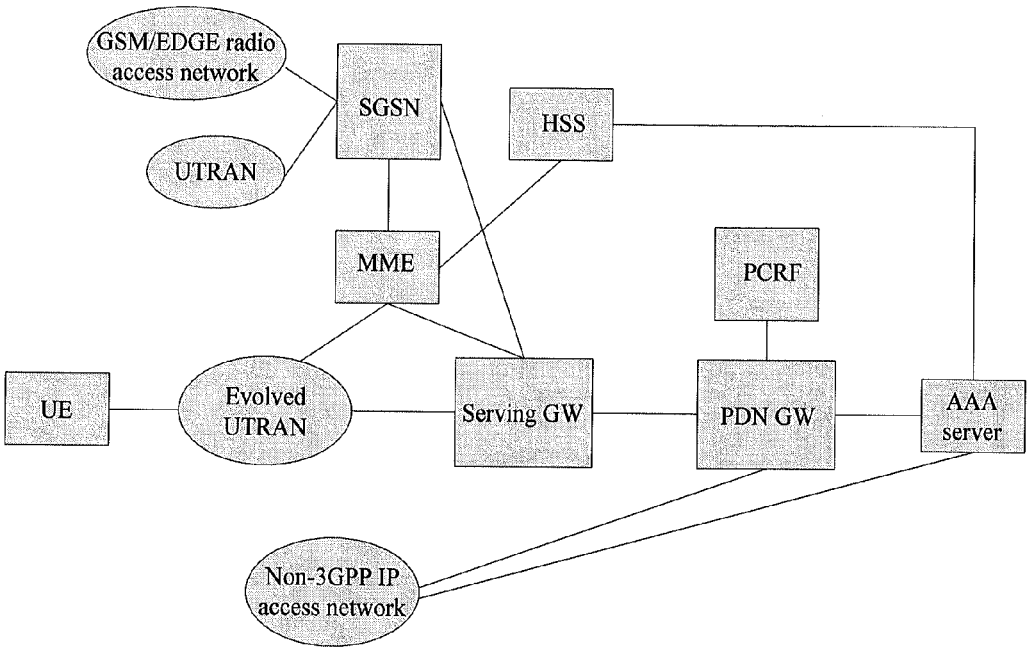
FIG. 1 shows system architecture of an evolved network in an embodiment of the present disclosure.

FIG. 1 shows system architecture of an evolved network in an embodiment of the present disclosure. The architecture includes:

an E-UTRAN, configured to implement all radio-related functions in the evolved network;

a Mobility Management Entity (MME), responsible for control plane mobility management, including user context and Mobility state management, and allocation of temporary mobile subscriber identifiers;

a serving gateway (GW), which is a user plane anchor between 3GPP access systems and is configured to terminate the interface to the E-UTRAN;

a PDN GW, which is a user plane anchor between a 3GPP access system and a non-3GPP access system, and is configured to terminate the interface to the external Packet Data Network (PDN);

a Policy and Charging Rule Function (PCRF), responsible for policy control decision and flow based charging control;

an HSS, configured to store subscriber data;

a UMTS Terrestrial Radio Access Network (UTRAN) and a GSM/EDGE Radio Access Network (GERAN), configured to implement all radio-related functions in the existing GPRS/UMTS network;

a Serving GPRS Supporting Node (SGSN), configured to implement route forwarding, mobility management, session management, and subscriber data storage in a GPRS/UMTS network;

a non-3GPP IP access system, an access network defined by a non-3GPP organization, for example, Wireless Local Area Network (WLAN), and Worldwide Interoperability for Microwave Access (WiMAX); and an AAA server, configured to perform access authentication, authorization and accounting for the UE.

The foregoing architecture does not mean the ultimate System Architecture Evolution (SAE), and the ultimate architecture may differ from the foregoing architecture, as is not limited by the present disclosure.

Figure 2:
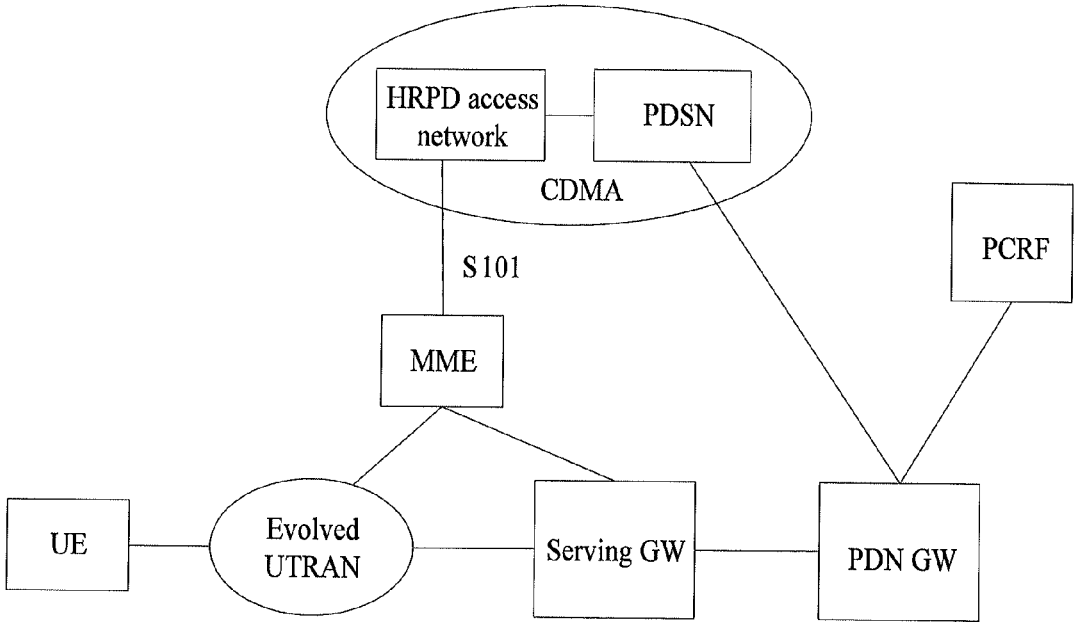
FIG. 2 shows system architecture of optimized handover so between an HRPD access system and an E-UTRAN access system in an embodiment of the present disclosure.

FIG. 2 shows system architecture of optimized handover between an HRPD access system and an E-UTRAN access system in an embodiment of the present disclosure. An S101 interface is added between the MME and the HRPD Access Network (HRPD AN) which is responsible for mobility management and radio resource management in the HRPD network. This interface transmits the signaling between the MME and the HRPD AN. A Packet Data Serving Node (PDSN) is a user plane processing network element in an HRPD network, and performs user plane processing in the HRPD network.

Figure 3:
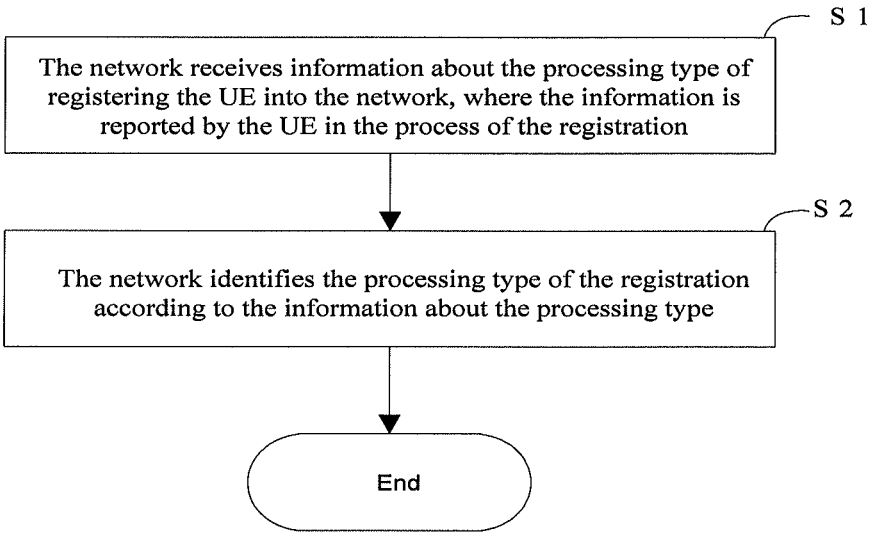
FIG. 3 is a flowchart of a method in an embodiment of the present disclosure.

The registration processing method, the handover processing method, the system, and the apparatus disclosed herein are based on the foregoing two types of system architecture, and are elaborated below:

In order to enable the network to distinguish between different registration processing types, a registration processing method is disclosed in an embodiment of the present disclosure. As illustrated in FIG. 3, the method includes the following steps:

S1. The network receives information about the processing type of registering the UE into the network, where the information is reported by the UE during the registration.

Before this step, the UE may identify the type of the registration when registering into the network. The UE reports the information about the processing type corresponding to the identified registration type to the network during registering into the network.

S2. The network identifies the processing type of the registration according to the information about the processing type.

Another registration processing method is disclosed in an embodiment of the present disclosure. The method includes: The network receives information about a processing type of registering a UE, where the information is reported by an HSS or an AAA server; and the network identifies the processing type of the registration according to the information about the processing type.

Figure 4:
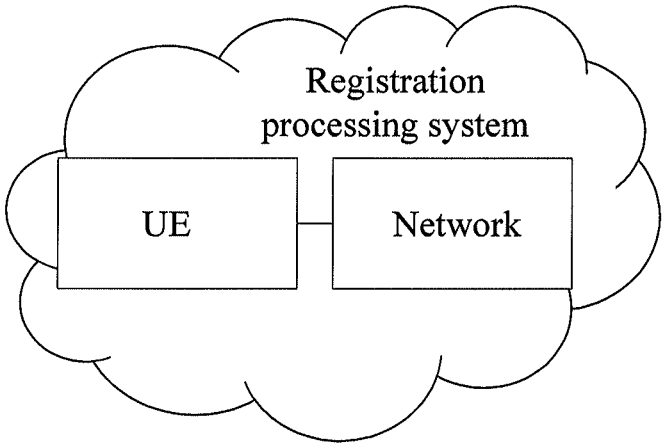
FIG. 4 shows a structure of a system in an embodiment of the present disclosure.

A registration processing system is disclosed in an embodiment of the present disclosure. As illustrated in FIG. 4, the system includes a UE and a network.

The UE is configured to report information about the processing type of registering the UE into a network during the registration. The UE identifies the processing type of the registration during registering into the network and then reports the registration processing type information.

The network is configured to identify the processing type of the registration according to the received registration processing type information reported by the UE. Specifically, the network-side MME (in an evolved network), SGSN (in a 2G/3G network), or non-3GPP GW (in a non-3GPP network) identifies the processing type information reported by the UE.

Figure 5:
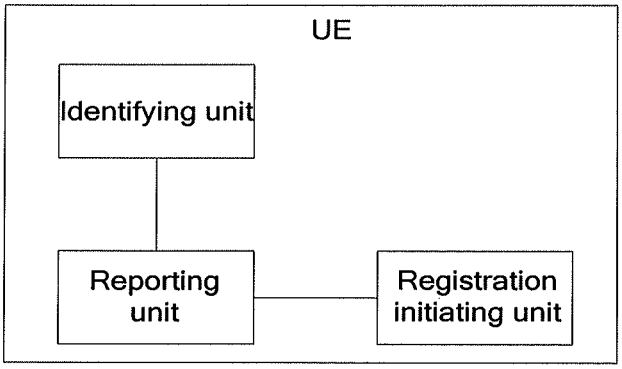
FIG. 5 shows a structure of a UE in an embodiment of the present disclosure.

A UE is disclosed in an embodiment of the present disclosure. As illustrated in FIG. 5, the UE includes:

an identifying unit, configured to identify the type of registration when the UE initiates the registration;

a registration initiating unit, configured to initiate registration, and send a registration triggering signal; and a reporting unit, configured to receive the registration triggering signal from the registration initiating unit, and report the processing type information during registering the UE into the network, where the processing type information corresponds to the registration type identified by the identifying unit. The reporting modes include but are not limited to: The reporting unit includes the processing type information in an information element (IE) of an Attach Request message; or the reporting unit includes the processing type information in an IE of a TAU request message; or the reporting unit includes the processing type information in an IE of a Routing Area Update (RAU) request message; or the reporting unit includes the processing type information in an IE of an Access Request message; or the reporting unit includes the processing type information in an IE of an Access Authentication message or an Authentication message; or the reporting unit includes the processing type information in an IE of an Internet Key Exchange Protocol Version 2 (IKEv2) or IP Security Protocol Security Association (IPsec SA) Setup request message.

The detailed reporting procedure of the reporting unit is: the reporting unit sends different Attach Request messages to the network based on different registration types; or the reporting unit sends different TAU request messages to the network based on different registration types; or the reporting unit sends different RAU request messages to the network based on different registration types; or the reporting unit sends different Access Request messages to the network based on different registration types.

Figure 6:
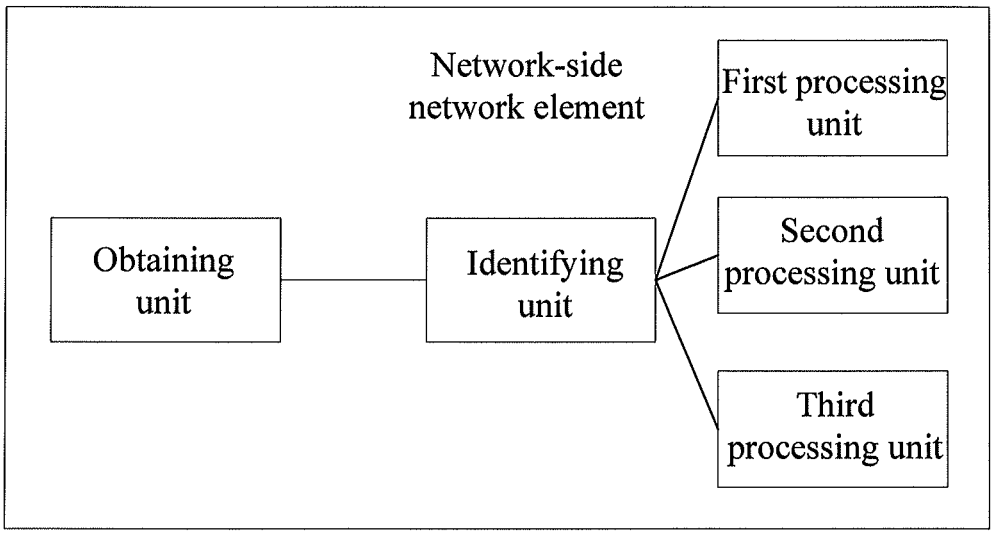
FIG. 6 shows a structure of a network-side network element in an embodiment of the present disclosure.

A network-side network element is disclosed in an embodiment of the present disclosure. The network element is an MME (evolved network), SGSN (2G/3G network), or non-3GPP gateway (non-3GPP network). As illustrated in FIG. 6, the network element includes an obtaining unit and an identifying unit.

The obtaining unit is configured to obtain the registration processing type information reported by the UE during registering the UE into the network. Specifically, the obtained processing type information is reported by the UE, the HSS or the AAA server.

The identifying unit is configured to identify the processing type of the registration according to the processing type information obtained by the obtaining unit.

The network element further includes a first processing unit, which is configured to initiate a network-initiate bearer create procedure to create the bearer resources for the UE after the identifying unit identifies that the registration processing type is a handover registration processing type.

The network element further includes a second processing unit, which is configured to not initiate resource release procedure to release the source access network resources after the identifying unit identifies that the registration processing type is an active-mode handover registration processing type.

The network element further includes a third processing unit, which is configured to initiate a procedure of creating a data forwarding tunnel between a network element of the target network and a network element of the source network after the identifying unit identifies that the registration processing type is an active-mode handover registration processing type.

The present disclosure is elaborated through several embodiments below:

Embodiment 1

Figure 7:
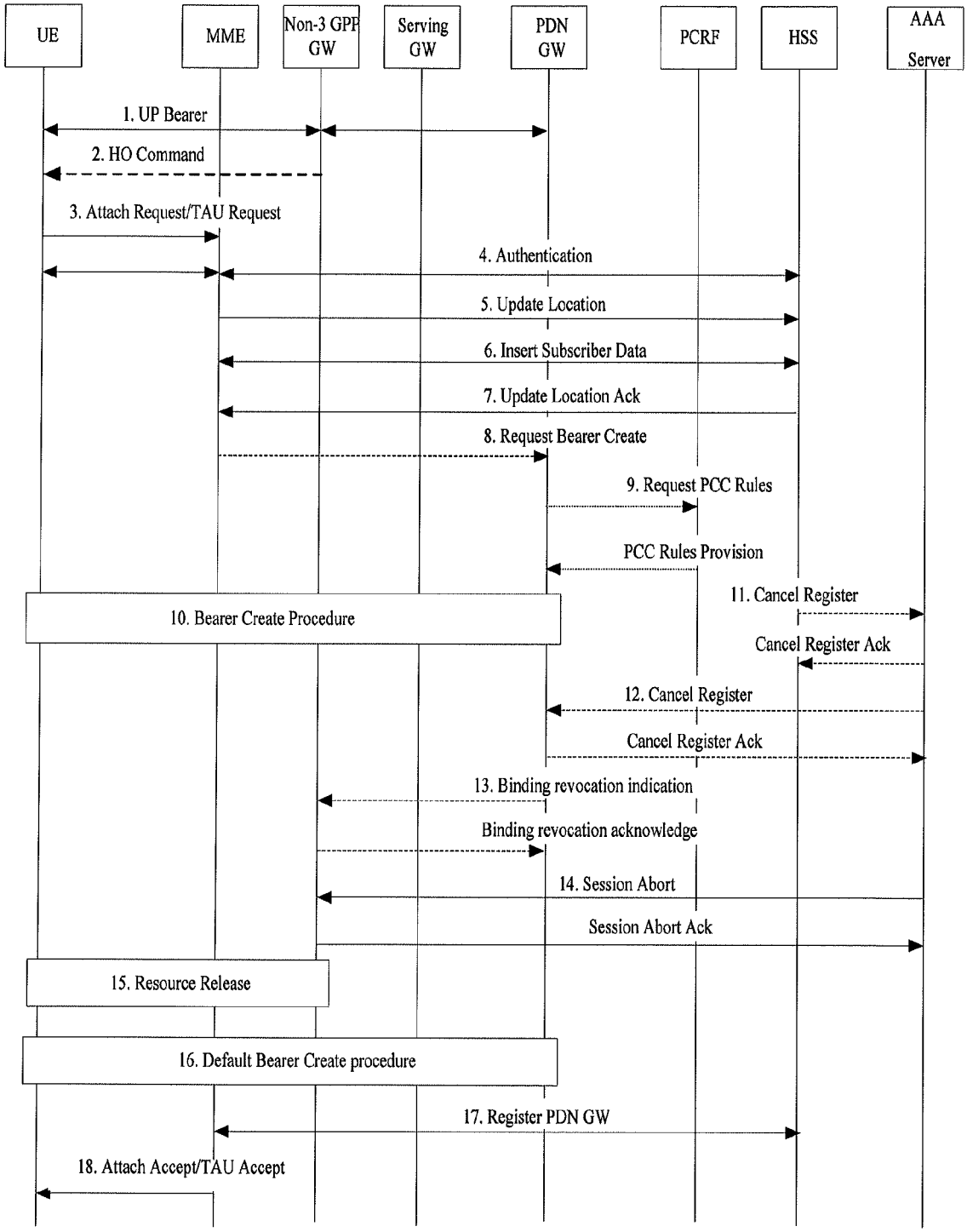
FIG. 7 is a flowchart of the first embodiment of the present disclosure.

When the UE sends a registration request message to the MME, the UE reports the registration processing type information to the MME. The MME identifies the processing type of the registration according to the information, and performs the corresponding procedure according to registration processing type to complete the registration. The MME reports the registration processing type to the HSS. For the registration caused by handover, the network initiates a bearer creation procedure to create resources in the 3GPP network used by the UE in the source non-3GPP network. For initialization registration, if the HSS stores the PDN GW address used by the UE in the non-3GPP network, the HSS notifies the AAA server to cancel the UE registration in the non-3GPP network. The AAA server notifies the non-3GPP network to release the resource used by the UE. As illustrated in FIG. 7, the process includes the following steps:

1. The UE accesses the non-3GPP AN through the non-3GPP GW and the PDN GW.

2. The non-3GPP network element sends a Handover Command (HO Command) to the UE, notifying the UE to hand over to the evolved network; or the UE discovers the evolved network and decides to initiate handover.

3. Before initiating registration into the evolved network, the UE identifies the type of the registration. Afterward, the UE sends a registration request message to the MME, and reports the registration processing type to the MME.

The registration processing type may be reported in one of the following ways:

(1) An Attach Type IE is added in the Attach Request message. For example, the values of the Attach Type IE are 0 and 1. The value "0" corresponds to Normal Attach (also known as Initial Attach), and indicates that the Attach Request message is a normal Attach Request message (also known as initial Attach Request message); and the value "1" corresponds to HandoverAttach, and indicates that the Attach Request message is caused by handover. Alternatively, the UE adds an indication bit in the Attach Request message to indicate that the Attach Request message is caused by handover. The original Attach Request message indicates a normal Attach Request message (also known as initial Attach Request message). The indication bit may be:

(a) a Handover Indication IE;

(b) a Cause IE. The UE sets the Cause IE to "Attach due to Handover"; or (c) an Attach Type IE. The UE sets this IE to "Handover Attach".

(2) A new message is defined. For example, a new Handover Attach Request message is defined. This message indicates an Attach Request message caused by handover. The old Attach Request message indicates a normal Attach Request message (also known as an initial Attach Request message). In this way, the UE can send different Attach Request messages to the network to indicate the corresponding registration processing type information. Alternatively, a new message corresponding to the normal Attach Request message (also known as initial Attach Request message) is defined, and the original Attach Request message corresponds to the Attach Request message caused by handover. Alternatively, both the Attach Request message caused by handover and the normal Attach Request message (also known as initial Attach Request message) are redefined.

(3) An Update Type IE is added in the TAU request message. For example, the values of the Update Type IE are 0 and 1. The value "0" corresponds to Normal TAU (also known as Initial TAU), and indicates that the TAU request message is a normal TAU request message (also known as initial TAU request message); and the value "1" corresponds to Handover TAU, and indicates that the TAU request message is caused by handover. Alternatively, the UE adds an indication bit in the TAU request message to indicate that the TAU request message is caused by handover. The original TAU request message indicates a normal TAU request message (also known as initial TAU request message). The indication bit may be:

(a) a Handover Indication IE;

(b) a Cause IE. The UE sets the Cause IE to "TAU due to Handover"; or (c) an Update Type IE. The UE sets this IE to "Handover TAU".

(4) A new message is defined. For example, a new Handover TAU Request message is defined. This message indicates a TAU request message caused by handover. The old TAU request message indicates a normal TAU request message (also known as an initial TAU request message). In this way, the UE can send different TAU request messages to the network to indicate the corresponding registration processing type information. Alternatively, a new message corresponding to the normal TAU request message (also known as initial TAU request message) is defined, and the original TAU request message corresponds to the TAU request message caused by handover. Alternatively, both the TAU request message caused by handover and the normal TAU request message (also known as initial TAU request message) are redefined.

4. An authentication procedure is performed between the UE, the MME, and the HSS to obtain the PDN GW address used by the UE. In this step, the MME may report the registration processing type of the UE to the HSS. If the registration processing type is a handover processing type, the HSS may provide the MME with the PDN GW address used by the UE in the non-3GPP AN.

5. The MME sends an Update Location message to the HSS, and registers the address of the MME into the HSS. In this step, the MME may report the registration processing type of the UE to the HSS.

6. The HSS inserts the subscriber data into the MME.

7. The HSS returns an Update Location Ack message to the MME. In this step, the HSS may provide the MME with the PDN GW address used by the UE in the non-3GPP AN.

In the UE registration process, if the HSS identifies the UE registration processing type (for example, the HSS finds that it stores the PDN GW address used by the UE in the non-3GPP AN, the HSS determines that the UE registration processing type is registration caused by handover. Otherwise, the HSS determines that the UE registration processing type is a normal registration processing type), the HSS adds an indication bit into the message to notify MME of the UE registration processing type information. The indication bit may be:

a) a Handover Indication IE. If the UE registration processing type is registration caused by handover, the HSS adds a Handover Indication IE. For a normal registration processing type, the HSS does not add this IE;

b) a Cause IE. For the registration caused by handover, the HSS sets the Cause IE to "Update due to Handover Attach". For normal registration, the HSS sets the Cause IE to "Update due to Initial Attach", or does not add the Cause IE; or c) an Update Type IE. For the registration caused by handover, the HSS sets this IE to "Handover Attach". For normal registration, the HSS sets this IE to "Initial Attach", or does not add this IE.

8. The MME identifies the processing type of the registration according to the registration processing type information reported by the UE or the HSS.

Now the MME succeeds in distinguishing between different registration processing types.

Further, if the processing type is normal registration, the MME performs the normal registration procedure, and steps 11-18 are performed.

If the processing type is registration caused by handover, the MME sends a Create Bearer Request message to the obtained PDN GW address, requesting the network to initiate bearer creation procedure. In this way, the service used by the UE in the non-3GPP AN is re-created in the new access system. The process proceeds to step 9.

9. If it is necessary to obtain the Policy and Charging Control (PCC) rules applied by the user from the PCRF, the PDN GW sends a Request PCC Rules message to the PCRF to obtain the PCC rules applied by the user. The PCRF provides the PDN GW with the PCC rules applied by the user.

10. The PDN GW initiates a network-initiate bearer creation procedure to create the bearer of the user, and then the process proceeds to step 18.

11. If the UE registration processing type is normal registration and the HSS stores the registered PDN GW addresses, and if such PDN GW addresses are the PDN GW addresses used by the UE when the UE accesses the non-3GPP AN and are registered into the HSS through the AAA server, the HSS sends a Cancel Register message to the AAA server, requesting to cancel the UE registration in the non-3GPP AN. The AAA server returns a Cancel Register Ack message to the HSS.

12. The AAA server sends a Cancel Register message to the PDN GW, requesting to cancel the UE registration in the non-3GPP AN. The PDN GW returns a Cancel Register Ack message to the AAA server.

13. If the interface protocol between the PDN GW and the non-3GPP GW is a Proxy Mobile Internet Protocol (PMIP), the PDN GW sends a Binding Revocation Indication message to the non-3GPP GW to cancel the PMIP binding between the non-3GPP GW and the PDN GW. The non-3GPP GW returns a Binding Revocation Acknowledge message to the PDN GW.

14. The AAA server may also send a Session Abort message to the non-3GPP GW. The non-3GPP GW returns a Session Abort Ack message to the AAA server.

15. After receiving the Binding Revocation Indication message or the Session Abort message, the non-3GPP GW initiates a resource release procedure to release the resource used by the UE in the non-3GPP AN.

16. If the registration processing type of the UE is normal registration, the MME initiates a default bearer creation procedure to create a default bearer between the UE and the PDN GW.

17. The MME registers the PDN GW address used by the UE into the HSS. This operation may also be handled through a location update procedure. The MME sends an Update Location message including the PDN GW address to the HSS.

18. The MME returns an Attach Accept message or a TAU Accept message to the UE.

Embodiment 2

Figure 8:
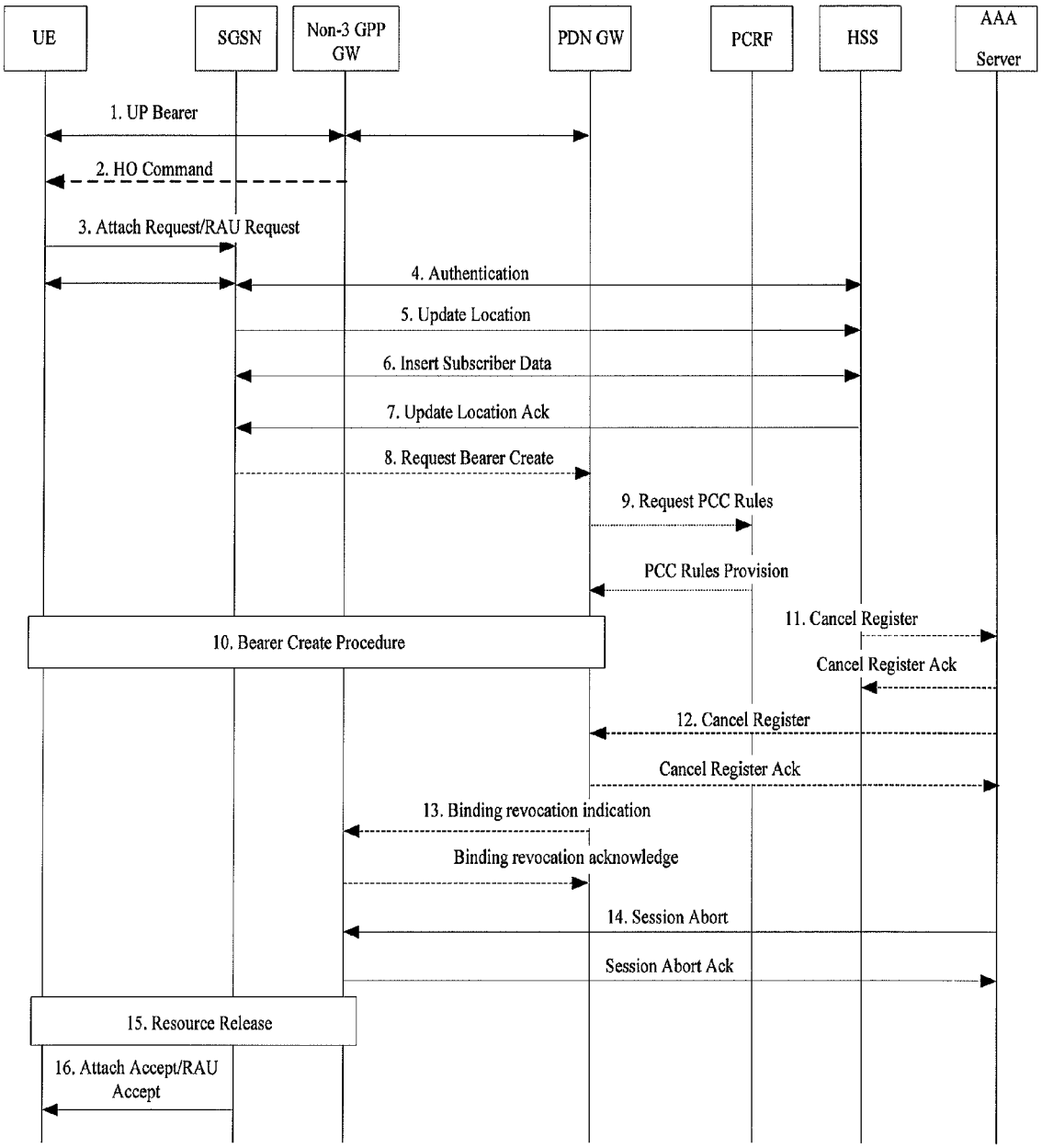
FIG. 8 is a flowchart of the second embodiment of the present disclosure.

The foregoing mechanism is also applicable to a 2G system and a 3G system. When the UE sends a registration request message to the SGSN, the UE reports the registration processing type information to the SGSN. The SGSN identifies the registration processing type according to the information. Further, the SGSN performs the corresponding operations according to the registration processing type to complete the registration. The SGSN reports the registration processing type to the HSS. For the registration caused by handover, the network initiates a bearer creation procedure to create resources in the 3GPP network used by the UE in the source non-3GPP network. For initialization registration, if the HSS stores the PDN GW address used by the UE in the non-3GPP network, the HSS notifies the AAA server to cancel the UE registration in the non-3GPP network. The AAA server notifies the non-3GPP network to release the resource used by the UE. As illustrated in FIG. 8, the process includes the following steps:

1. The UE accesses the non-3GPP AN through the non-3GPP GW and the PDN GW.

2. The non-3GPP network element sends an HO Command to the UE, notifying the UE to hand over to the 2G or 3G network; or the UE discovers the 2G or 3G network and decides to initiate handover.

3. Before initiating registration into the 2G or 3G network, the UE identifies the type of the registration. Afterward, the UE sends a registration request message to the SGSN, and reports the registration processing type to the SGSN.

The registration processing type may be reported in one of the following ways:

(1) An Attach Type IE is added in the Attach Request message. For example, the values of the Attach Type IE are 0 and 1. The value "0" corresponds to Normal Attach (also known as Initial Attach), and indicates that the Attach Request message is a normal Attach Request message (also known as initial Attach Request message); and the value "1" corresponds to HandoverAttach, and indicates that the Attach Request message is caused by handover. Alternatively, the UE adds an indication bit in the Attach Request message to indicate that the Attach Request message is caused by handover. The original Attach Request message indicates a normal Attach Request message (also known as initial Attach Request message). The indication bit may be:

a) a Handover Indication IE;

b) a Cause IE. The UE sets the Cause IE to "Attach due to Handover"; or c) an Attach Type IE. The UE sets this IE to "Handover Attach".

(2) A new message is defined. For example, a new Handover Attach Request message is defined. This message indicates an Attach Request message caused by handover. The old Attach Request message indicates a normal Attach Request message (also known as an initial Attach Request message). In this way, the UE can send different Attach Request messages to the network to indicate the corresponding registration processing type information. Alternatively, a new message corresponding to the normal Attach Request message (also known as initial Attach Request message) is defined, and the original Attach Request message corresponds to the Attach Request message caused by handover. Alternatively, both the Attach Request message caused by handover and the normal Attach Request message (also known as initial Attach Request message) are redefined.

(3) An Update Type IE is added in the RAU request message. For example, the values of the Update Type IE are 0 and 1. The value "0" corresponds to Normal RAU (also known as Initial RAU), and indicates that the RAU request message is a normal RAU request message (also known as initial RAU request message); and the value "1" corresponds to Handover RAU, and indicates that the RAU request message is caused by handover. Alternatively, the UE adds an indication bit in the RAU request message to indicate that the RAU request message is caused by handover. The original RAU request message indicates a normal RAU request message (also known as initial RAU request message). The indication bit may be:

a) a Handover Indication IE;

b) a Cause IE. The UE sets the Cause IE to "RAU due to Handover"; or c) an Update Type IE. The UE sets this IE to "Handover RAU".

(4) A new message is defined. For example, a new Handover RAU Request message is defined. This message indicates an RAU request message caused by handover. The old RAU request message indicates a normal RAU request message (also known as an initial RAU request message). In this way, the UE can send different RAU request messages to the network to indicate the corresponding registration processing type information. Alternatively, a new message corresponding to the normal RAU request message (also known as initial RAU request message) is defined, and the original RAU request message corresponds to the RAU request message caused by handover. Alternatively, both the RAU request message caused by handover and the normal RAU request message (also known as initial RAU request message) are redefined.

4. An authentication procedure is performed between the UE, the SGSN, and the HSS. In this step, the SGSN may report the registration processing type of the UE to the HSS. If the registration processing type is a handover processing type, the HSS may provide the SGSN with the PDN GW address used by the UE in the non-3GPP AN.

5. The SGSN sends an Update Location message to the HSS, and registers the address of the SGSN into the HSS. In this step, the SGSN may report the registration processing type of the UE to the HSS.

6. The HSS inserts the subscriber data into the SGSN.

7. The HSS returns an Update Location Ack message to the SGSN. In this step, the HSS may provide the SGSN with the PDN GW address used by the UE in the non-3GPP AN. In the UE registration process, if the HSS identifies the UE registration processing type (for example, the HSS finds that it stores the PDN GW address used by the UE in the non-3GPP AN, the HSS determines that the UE registration processing type is registration caused by handover. Otherwise, the HSS determines that the UE registration processing type is a normal registration processing type), the HSS adds an indication bit into the message to notify SGSN of the UE registration processing type information. The indication bit may be:

a) a Handover Indication IE. If the UE registration processing type is registration caused by handover, the HSS adds a Handover Indication IE. For a normal registration processing type, the HSS does not add this IE;

b) a Cause IE. For the registration caused by handover, the HSS sets the Cause IE to "Update due to Handover Attach". For normal registration, the HSS sets the Cause IE to "Update due to Initial Attach", or does not add the Cause IE; or c) an Update Type IE. For the registration caused by handover, the HSS sets this IE to "Handover Attach". For normal registration, the HSS sets this IE to "Initial Attach", or does not add this IE.

8. The SGSN identifies the processing type of the registration according to the registration processing type information reported by the UE or the HSS.

Now the SGSN succeeds in distinguishing between different registration processing types.

Further, if the processing type is normal registration, the SGSN performs the normal registration procedure, and steps 11-16 are performed.

If the processing type is registration caused by handover, the SGSN sends a Create Bearer Request message to the obtained PDN GW (namely, the current Gateway GPRS Supporting Node (GGSN)) address, requesting the network to initiate bearer creation procedure. In this way, the service used by the UE in the non-3GPP network is re-created in the new access system. The process proceeds to step 9.

9. If it is necessary to obtain the PCC rules applied by the user from the PCRF, the PDN GW sends a Request PCC Rules message to the PCRF to obtain the PCC rules applied by the user. The PCRF provides the PDN GW with the PCC rules applied by the user.

10. The PDN GW initiates a network-initiate bearer creation procedure to create the bearer of the user, and then the process proceeds to step 16.

Steps 11-15 are the same as the counterpart in the first embodiment, and are not repeated here any further.

16. The SGSN returns an Attach Accept message or an RAU Accept message to the UE.

Embodiment 3

Figure 9:
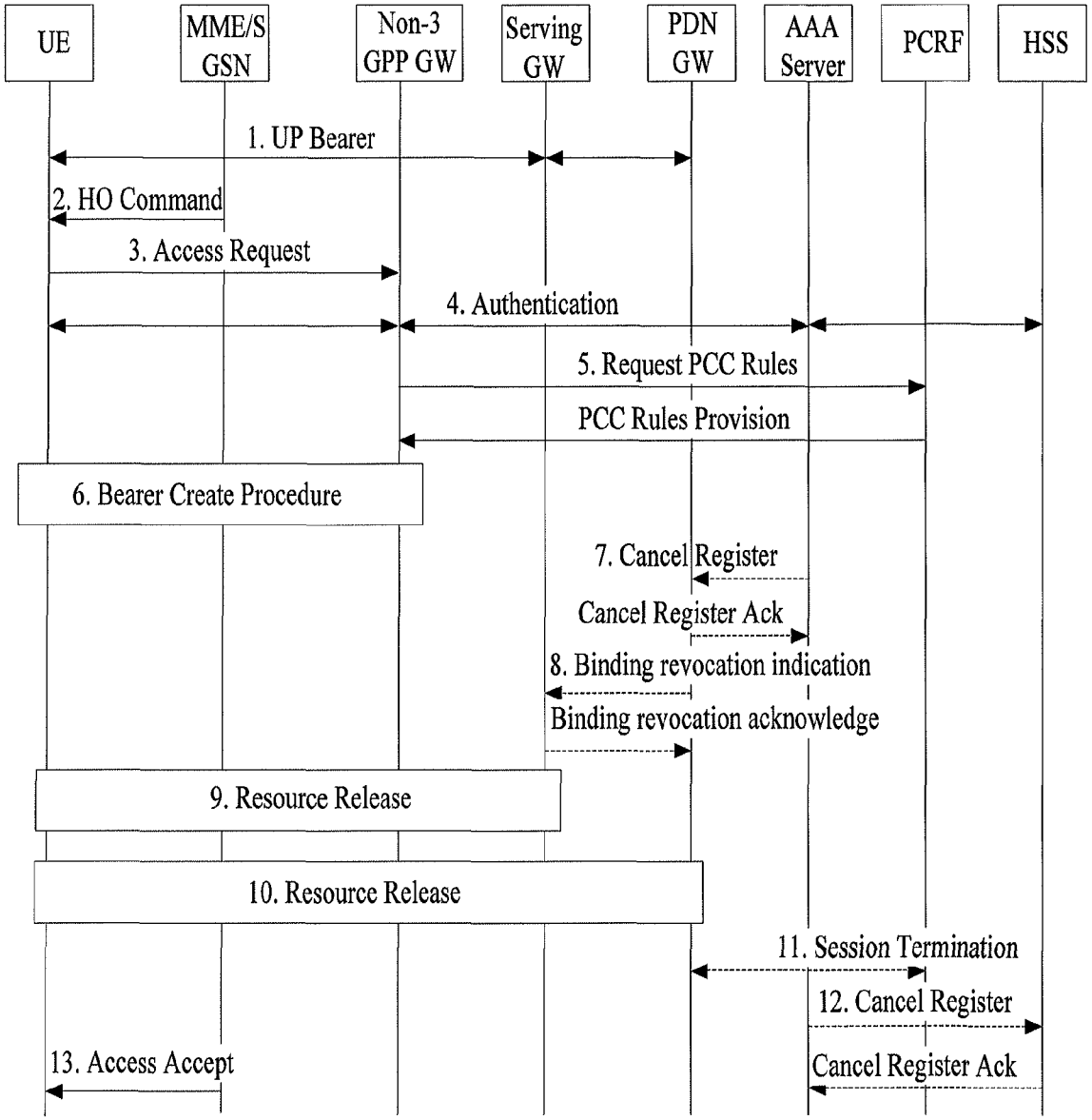
FIG. 9 is a flowchart of the third embodiment of the present disclosure;l

The foregoing mechanism is also applicable to a trusted non-3GPP system. When the UE sends a registration request message to the non-3GPP GW, the UE reports the registration processing type information to the non-3GPP GW. The non-3GPP GW identifies the processing type of the registration according to the information, and creates a bearer for the UE according to registration processing type to complete the registration. The non-3GPP GW reports the registration processing type to the AAA server, and the AAA server reports the registration processing type to the HSS. For the registration caused by handover, the network initiates a bearer creation procedure to create resources in the non-3GPP network used by the UE in the source 3GPP network. For initialization registration, if the AAA server stores the PDN GW address used by the UE in the 3GPP network, the AAA server notifies the HSS to cancel the UE registration in the 3GPP network, and the AAA server notifies the PDN GW to release the resource used by the UE in the 3GPP network. As illustrated in FIG. 9, the process includes the following steps:

1. The UE accesses the 3GPP network through the serving GW and the PDN GW.

2. The MME or the SGSN sends an HO Command to the UE, notifying the UE to hand over to the non-3GPP network; or the UE discovers the non-3GPP network and decides to initiate handover.

3. Before initiating registration into the non-3GPP network, the UE identifies the type of the registration. Afterward, the UE sends an Access Request message to the non-3GPP GW, and reports the registration processing type to the non-3GPP GW.

The registration processing type may be reported in one of the following ways:

(1) An Access Type IE is added in the Access Request message. For example, the values of the Access Type IE are 0 and 1. The value "0" corresponds to Normal Access (also known as Initial Access), and indicates that the Access Request message is a normal Access Request message (also known as initial Access Request message); and the value "1" corresponds to Handover Access, and indicates that the Access Request message is caused by handover. Alternatively, the UE adds an indication bit in the Access Request message to indicate that the Access Request message is caused by handover. The original Access Request message indicates a normal Access Request message (also known as initial Access Request message). The indication bit may be:

a) a Handover Indication IE;

b) a Cause IE. The UE sets the Cause IE to "Access due to Handover"; or c) an Access Type IE. The UE sets this IE to "Handover Access".

(2) A new message is defined. For example, a new Handover Access Request message is defined. This message indicates an Access Request message caused by handover. The old Access Request message indicates a normal Access Request message (also known as an initial Access Request message). In this way, the UE can send different Access Request messages to the network to indicate the corresponding registration processing type information. Alternatively, a new message corresponding to the normal Access Request message (also known as initial Access Request message) is defined, and the original Access Request message corresponds to the Access Request message caused by handover. Alternatively, both the Access Request message caused by handover and the normal Access Request message (also known as initial Access Request message) are redefined.

4. An authentication procedure is performed between the UE, the non-3GPP GW, the AAA server, and the HSS. In this step, the UE may report the registration processing type to the non-3GPP GW. The UE puts an Access Type cell in the message of the authentication procedure. For example, the values of the Access Type IE are 0 and 1. The value "0" corresponds to Normal Access (also known as Initial Access), and indicates that the Access Request message is a normal Access Request message (also known as initial Access Request message); and the value "1" corresponds to Handover Access, and indicates that the Access Request message is caused by handover.

Alternatively, the UE puts an Attach Type cell in the message of the authentication procedure. For example, the values of the Attach Type IE are 0 and 1. The value "0" corresponds to Normal Attach (also known as Initial Attach), and indicates that the registration processing type of the UE is normal registration (also known as initial registration); and the value "1" corresponds to Handover Attach, and indicates that the registration processing type of the UE is registration caused by handover.

Alternatively, the UE adds an indication bit in the message of the authentication procedure to indicate that the registration processing type of the UE is registration caused by handover. The original message of the authentication procedure indicates normal registration (also known as initial registration). The indication bit may be:

a) a Handover Indication IE;

b) a Cause IE. The UE sets the Cause IE to "Attach due to Handover"; or c) an Attach Type IE. The UE sets this IE to "Handover Attach".

In this step, the non-3GPP GW reports the registration processing type of the UE to the AAA server.

In the UE registration process, if the AAA server identifies the UE registration processing type (for example, the AAA server finds that it stores the PDN GW address used by the UE in the 3GPP AN, the AAA server determines that the UE registration processing type is registration caused by handover. Otherwise, the AAA server determines that the UE registration processing type is a normal registration processing type), the AAA server adds an indication bit in the message to notify the registration processing type information to non-3GPP GW. The indication bit may be:

a) a Handover Indication IE. If the UE registration processing type is registration caused by handover, the AAA server adds a Handover Indication IE. For a normal registration processing type, the AAA server does not add this IE;

b) a Cause IE. For the registration caused by handover, the AAA server sets the Cause IE to "Update due to Handover Attach". For normal registration, the AAA server sets the Cause IE to "Update due to Initial Attach", or does not add the Cause IE; or c) an Update Type IE. For the registration caused by handover, the AAA server sets this IE to "Handover Attach". For normal registration, the AAA server sets this IE to "Initial Attach", or does not add this IE.

5. The non-3GPP GW identifies the processing type of the registration according to the registration processing type information reported by the UE.

Now the non-3GPP GW succeeds in distinguishing between different registration processing types.

Further, if the processing type is normal access, the non-3GPP GW performs the normal access procedure, and steps 7-13 are performed.

If the processing type is access caused by handover, the non-3GPP GW sends a Request PCC Rules message to the PCRF to obtain the PCC rules applied by the user. The PCRF provides the non-3GPP GW with the PCC rules applied by the user, and then the process proceeds to step 6.

6. The non-3GPP GW initiates a network-initiate bearer creation procedure to create the bearer of the user, and then the process proceeds to step 13.

7. If the UE registration processing type is normal registration and the AAA server stores the registered PDN GW addresses, and if such PDN GW addresses are the PDN GW addresses used by the UE when the UE accesses the 3GPP AN and are registered into the AAA server through the HSS, the AAA server sends a Cancel Register message to the PDN GW, requesting to cancel the UE registration in the 3GPP AN. The PDN GW returns a Cancel Register Ack message to the AAA server.

8. If the interface protocol between the PDN GW and the serving GW is a PMIP, the PDN GW sends a Binding Revocation Indication message to the serving GW to cancel the PMIP binding between the serving GW and the PDN GW. The serving GW returns a Binding Revocation Acknowledge message to the PDN GW.

9. After receiving the Binding Revocation Indication message, the serving GW initiates a resource release procedure to release the resource used by the UE in the 3GPP AN.

10. If the interface protocol between the PDN GW and the serving GW is a GPRS Tunneling Protocol (GTP), the PDN GW initiates a resource release procedure to release the resource used by the UE in the 3GPP AN.

11. A session abort procedure is performed between the PDN GW and the PCRF, and the PCRF is notified to release the PCC rules applied by the UE in the 3GPP AN.

12. The AAA server sends a Cancel Register message to the HSS to cancel the UE registration in the HSS. The HSS returns a Cancel Register Ack message to the AAA server.

13. The non-3GPP GW returns an Access Accept message to the UE.

Embodiment 4

Figure 10:
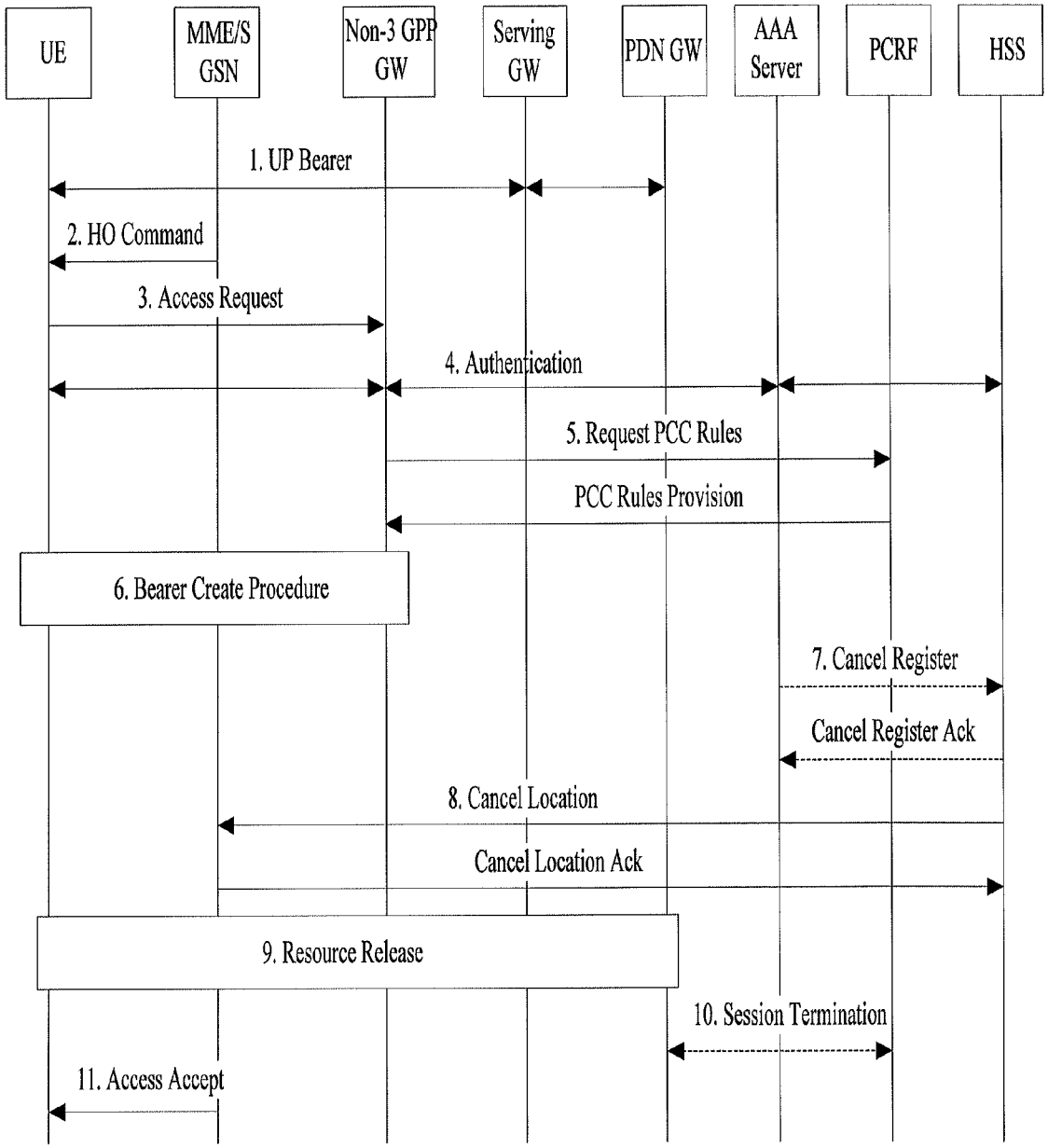
FIG. 10 is a flowchart of the fourth embodiment of the present disclosure.

The foregoing mechanism is also applicable to a trusted non-3GPP system. When the UE sends a registration request message to the non-3GPP GW, the UE reports the registration processing type information to the non-3GPP GW. The non-3GPP GW identifies the processing type of the registration according to the information, and creates a bearer for the UE according to registration processing type to complete the registration. The non-3GPP GW reports the registration processing type to the AAA server, and the AAA server reports the registration processing type to the HSS. For the registration caused by handover, the network initiates a bearer creation procedure to create resources in the non-3GPP network used by the UE in the source 3GPP network. For initialization registration, if the AAA server stores the PDN GW address used by the UE in the 3GPP network, the AAA server notifies the HSS to cancel the UE registration in the 3GPP network, and the HSS notifies the MME/SGSN to release the resource used by the UE in the 3GPP network. As illustrated in FIG. 10, the process includes the following steps:

Steps 1-6 are the same as the counterpart in the third embodiment, and are not repeated here any further.

7. If the UE registration processing type is normal registration and the AAA server stores the registered PDN GW addresses, and if such PDN GW addresses are the PDN GW addresses used by the UE when the UE accesses the 3GPP AN and are registered into the AAA server through the HSS, the AAA server sends a Cancel Register message to the HSS, requesting to cancel the UE registration in the HSS. The HSS returns a Cancel Register Ack message to the AAA server.

8. The HSS sends a Cancel Location message to the MME/SGSN. The MME/SGSN returns a Cancel Location Ack message to the HSS.

9. The MME/SGSN separates the UE to release the resource used by the UE in the 3GPP AN.

10. A session abort procedure is performed between the PDN GW and the PCRF, and the PCRF is notified to release the PCC rules applied by the UE in the 3GPP AN.

11. The non-3GPP GW returns an Access Accept message to the UE.

Embodiment 5

Figure 11:
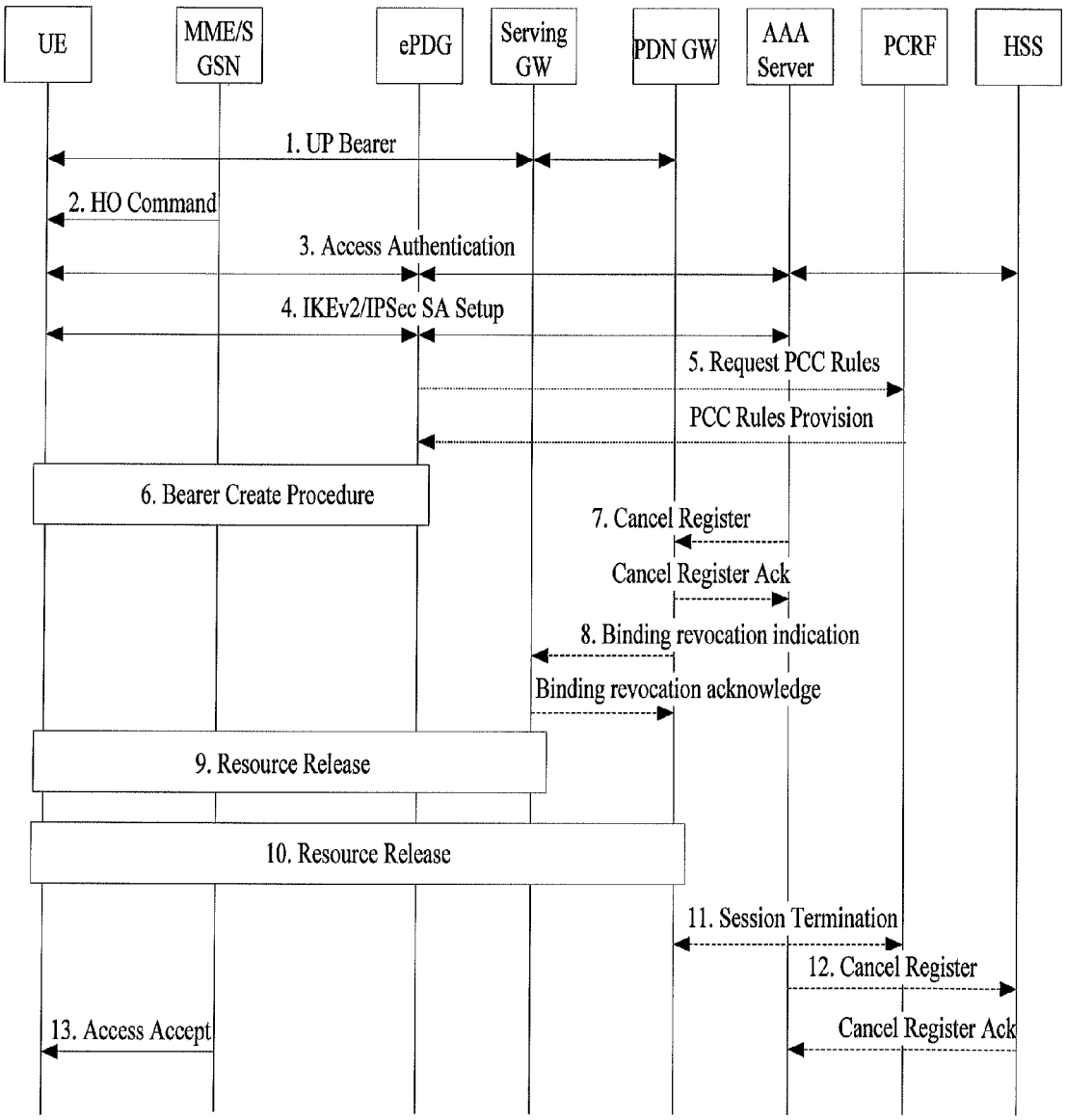
FIG. 11 is a flowchart of the fifth embodiment of the present disclosure.

The foregoing mechanism is also applicable to an untrusted non-3GPP system. When the UE sends an access authentication request or IKEv2/IPsec SA creation request message to an Evolved Packet Data Gateway (ePDG, a type of non-3GPP GW), the UE reports the registration processing type information to the ePDG. The ePDG identifies the registration processing type according to the information, creates a bearer for the UE according to the registration processing type, and completes the registration. The ePDG reports the registration processing type to the AAA server, and the AAA server reports the registration processing type to the HSS. For the registration caused by handover, the network initiates a bearer creation procedure to create resources in the non-3GPP network used by the UE in the source 3GPP network. For initialization registration, if the AAA server stores the PDN GW address used by the UE in the 3GPP network, the AAA server notifies the HSS to cancel the UE registration in the 3GPP network, and the AAA server notifies the PDN GW to release the resource used by the UE in the 3GPP network. As illustrated in FIG. 11, the process includes the following steps:

1. The UE accesses the 3GPP AN through the serving GW and the PDN GW.

2. The MME or the SGSN sends an HO Command to the UE, notifying the UE to hand over to the non-3GPP network; or the UE discovers the non-3GPP network and decides to initiate handover.

3. An authentication procedure is performed between the UE, ePDG AAA server, and HSS. In this step, the UE may report the registration processing type of the UE to the ePDG. The UE puts an Access Type cell in the message of the access authentication procedure. For example, the values of the Access Type IE are 0 and 1. The value "0" corresponds to Normal Access (also known as Initial Access), and indicates that the Access Request message is a normal Access Request message (also known as initial Access Request message); and the value "1" corresponds to Handover Access, and indicates that the Access Request message is caused by handover.

Alternatively, the UE puts an Attach Type IE in the message of the access authentication procedure. For example, the values of the Attach Type IE are 0 and 1. The value "0" corresponds to Normal Attach (also known as Initial Attach), and indicates that the registration processing type of the UE is normal registration (also known as initial registration); and the value "1" corresponds to Handover Attach, and indicates that the registration processing type of the UE is registration caused by handover.

Alternatively, the UE adds an indication bit in the message of the access authentication procedure to indicate that the registration processing type of the UE is registration caused by handover. The original message of the access authentication procedure indicates normal registration (also known as initial registration). The indication bit may be:

a) a Handover Indication IE;

b) a Cause IE. The UE sets the Cause IE to "Attach due to Handover"; or c) an Attach Type IE. The UE sets this IE to "Handover Attach".

In this step, the ePDG may report the registration processing type of the UE to the AAA server, and the AAA server reports the registration processing type of the UE to the HSS.

In the UE registration process, if the AAA server identifies the UE registration processing type (for example, the AAA server finds that it stores the PDN GW address used by the UE in the 3GPP AN, the AAA server determines that the UE registration processing type is registration caused by handover. Otherwise, the AAA server determines that the UE registration processing type is a normal registration processing type), the AAA server adds an indication bit in the message to notify the registration processing type information to ePDG. The indication bit may be:

a) a Handover Indication IE. If the UE registration processing type is registration caused by handover, the AAA server adds a Handover Indication IE. For a normal registration processing type, the AAA server does not add this IE;

b) a Cause IE. For the registration caused by handover, the AAA server sets the Cause IE to "Update due to Handover Attach". For normal registration, the AAA server sets the Cause IE to "Update due to Initial Attach", or does not add the Cause IE; or c) an Update Type IE. For the registration caused by handover, the AAA server sets this IE to "Handover Attach". For normal registration, the AAA server sets this IE to "Initial Attach", or does not add this IE.

4. An IKEv2/IPSec SA creation procedure is performed between the UE, ePDG and AAA server. In this step, the UE may report the registration processing type of the UE to the ePDG. The UE puts the Access Type IE or the Attach Type IE in the message of the IKEv2/IPSec SA creation procedure to indicate the registration processing type of the UE. Alternatively, the UE adds an indication bit in the message of the IKEv2/IPSec SA creation procedure to indicate that the registration processing type of the UE is registration caused by handover. The original message of the IKEv2/IPSec SA creation procedure indicates normal registration (also known as initial registration). The indication bit may be:

a) a Handover Indication IE;

b) a Cause IE. The UE sets the Cause IE to "Access due to Handover"; or c) an Access Type IE. The UE sets this IE to "Handover Access".

In this step, the ePDG may report the registration processing type of the UE to the AAA server, and the AAA server reports the registration processing type of the UE to the HSS.

5. The ePDG identifies the processing type of the registration according to the registration processing type information reported by the UE.

Now the ePDG succeeds in distinguishing between different registration processing types.

Further, if the processing type is normal access, the ePDG performs the normal access procedure, and steps 7-13 are performed.

If the processing type is access caused by handover, the ePDG sends a Request PCC Rules message to the PCRF to obtain the PCC rules applied by the user. The PCRF provides the non-3GPP GW with the PCC rules applied by the user, and then the process proceeds to step 6.

6. The ePDG initiates a network-initiate bearer creation procedure to create the bearer of the user, and then the process proceeds to step 13.

Steps 7-13 are the same as the counterpart in the third embodiment, and are not repeated here any further.

To sum up, in the embodiments of the present disclosure, the UE reports the registration processing type information to the network during registering into the network. Therefore, the network distinguishes between different registration processing types accordingly.

Further, the network may perform the corresponding procedure according to the identified processing type. Moreover, a mode of the UE reporting the registration processing type information by adding an IE or defining a new message is disclosed in an embodiment of the present disclosure.

Further, in addition to the Initial Attach and the Handover Attach processing types mentioned above, the registration processing types reported by the UE, HSS, and AAA server in this embodiment may include other registration processing types such as Pre-Registration (namely, the UE pre-registers into the target access network), Idle Mode Handover (namely, the UE hands over in the idle mode), and Active Mode Handover (namely, the UE hands over in the active mode). For a multi-mode or dual-mode UE (namely, the UE can access multiple networks simultaneously), possible registration processing types include: Power On Attach (namely, the UE is powered on), Normal Attach (namely, the UE accesses the network normally), Handover Attach (namely, the UE performs handover). This embodiment does not restrict the value of the registration processing type. Other registration processing types are described below, taking the Idle Mode Handover and the Active Mode Handover as examples:

Embodiment 6

Figure 12:
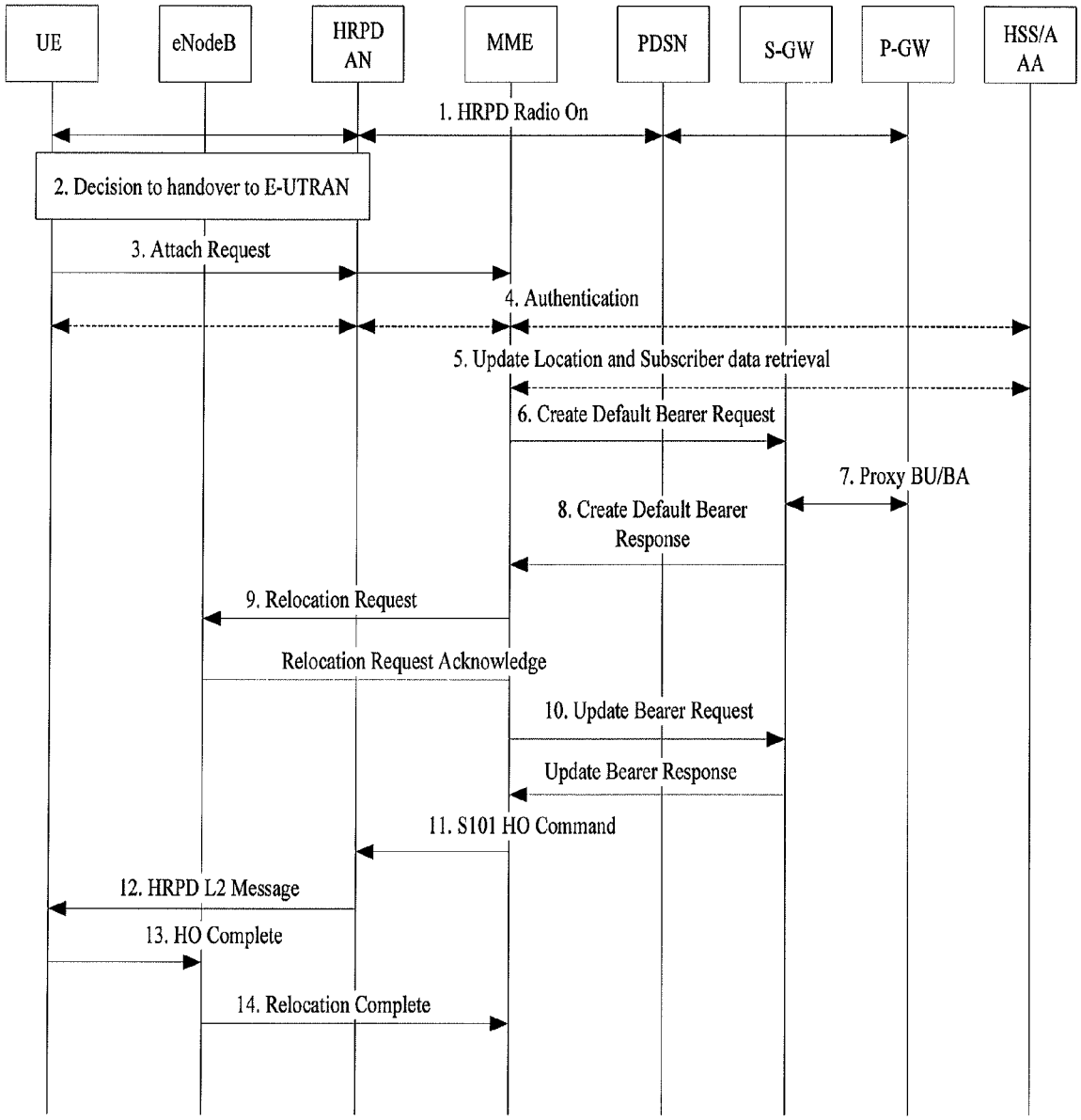
FIG. 12 is a flowchart of the sixth embodiment of the present disclosure.

When the UE hands over from an HRPD network to an E-UTRAN network in the active mode, the MME obtains the handover processing type of the UE. If determining that the handover processing type is handover of the UE in the active mode, the MME notifies the eNodeB to create resource on the access network side and use the preliminary path handover mechanism. As illustrated in FIG. 12, the process includes the following steps:

1. The UE accesses the system at the HRPD network.

2. The UE or the HRPD Access Network (AN) decides to perform handover to the 3GPP network.

3. The UE sends an Attach Request message to the MME through the HRPD network. The MME obtains the processing type information. The MME may obtain the processing type information in one of the following ways:

(1) The UE reports the processing type information: The Attach Request message sent by the UE to the MME indicates so whether the Attach procedure is handover in the idle state or handover in the active state. The specific mode of notifying the processing type may be:

✓ The UE adds an Attach Type IE in the Attach Request message to indicate the MME the handover processing type. Different values of the Attach Type indicate different processing types:

0 indicates Idle Mode Handover (handover in the idle mode); and 1 indicates Active Mode Handover (handover in the active mode).

✓ The UE adds a Cause IE in the Attach Request message to indicate the cause for the Attach Request message. The UE may set the following Cause values:

Idle Mode Handover: This cause value indicates that the Attach Request is caused by handover in the idle state; and Active Mode Handover: This cause value indicates that the Attach Request is caused by handover in the active state.

✓ The UE adds a UE State IE in the Attach Request message to report the state of the UE. According to the state of the UE, the MME knows whether the UE hands over in the idle state or in the active state. The UE may set the following UE State values:

0: indicates that the UE is in the idle state; and

1: indicates that the UE is in the active state.

✓ When the UE hands over in the active state, the UE adds an "active flag" IE in the Attach Request message to indicate the need of creating bearer on the access network side; and when the UE hands over in the idle state, the UE adds no "active flag" cell into the Attach Request message to indicate no need of creating bearer on the access network side. Alternatively, when the UE hands over in the active state, the UE sets the "active flag" IE to "True(1)" to indicate the need of creating bearer on the access network side; and when the UE hands over in the idle state, the UE sets the "active flag" IE to "False(0)" to indicate no need of creating bearer on the access network side.

✓ When the UE hands over in the idle state, the UE adds an "Non-active flag" IE in the Attach Request message to indicate no need of creating bearer on the access network side; and when the UE hands over in the active state, the UE adds no "Non-active flag" cell into the Attach Request message to indicate the need of creating bearer on the access network side. Alternatively, when the UE hands over in the idle state, the UE sets the "Non-active flag" IE to "True(1)" to indicate no need of creating bearer on the access network side; and when the UE hands over in the active state, the UE sets the "Non-active flag" IE to "False(0)" to indicate the need of creating bearer on the access network side.

(2) The HRPD AN reports the processing type information: The S101 interface message sent by the HRPD AN to the MME indicates whether the Attach procedure is handover in the idle state or handover in the active state. The specific mode of notifying the processing type may be:

✓ The HRPD AN adds an Attach Type IE in the S101 interface message to indicate the MME the handover processing type Different values of the Attach Type indicate different processing types:

0 indicates Idle Mode Handover (handover in the idle mode); and 1 indicates Active Mode Handover (handover in the active mode).

✓ The HRPD AN adds a Cause IE in the S101 interface message to indicate the cause for the Attach Request message. The HRPD AN may set the following Cause values:

Idle Mode Handover: This cause value indicates that the Attach Request is caused by handover in the idle state; and Active Mode Handover: This cause value indicates that the Attach Request is caused by handover in the active state.

✓ The HRPD AN adds a "UE State" IE into the S101 interface message to report the state of the UE. According to the state of the UE, the MME knows whether the UE hands over in the idle state or in the active state. The UE may set the following UE State values:

0: indicates that the UE is in the idle state; and

1: indicates that the UE is in the active state.

✓ When the UE hands over in the active state, the HRPD AN adds an "active flag" IE in the S101 interface message to indicate the need of creating bearer on the access network side; and when the UE hands over in the idle state, the HRPD AN adds no "active flag" IE in the S101 interface message to indicate no need of creating bearer on the access network side.

✓ When the UE hands over in the idle state, the HRPD AN include an "Non-active flag" IE in the S101 interface message to indicate no need of creating bearer on the access network side; and when the UE hands over in the active state, the HRPD AN adds no "Non-active flag" IE in the S101 interface message to indicate the need of creating bearer on the access network side.

4. The authentication procedure is performed.

5. The MME sends an Update Location message to the HSS to obtain the subscriber data of the UE. The HSS returns the subscriber data of the UE, including the PDN GW address used by the UE.

6. The MME selects a serving GW, and sends a Create Default Bearer Request message to the serving GW. According to the information included in the Attach Request message, the MME knows whether the UE hands over in the idle state or in the active state. If the MME finds that the UE hands over in the active state, the Create Default Bearer Request message sent by the MME requests the serving GW to perform "preliminary path handover".

7. After receiving the Create Default Bearer Request message, the serving GW initiates a preliminary path handover procedure if finding that the message requests the serving GW to perform "preliminary path handover". The serving GW sends a Proxy BU message to the PDN GW. After receiving the foregoing message, the PDN GW switches the user plane route to the serving GW. That is, the PDN GW sends the received downlink data to the serving GW.

8. The serving GW returns a Create Default Bearer Response message to the MME.

9. According to the information included in the Attach Request message, the MME knows whether the UE hands over in the idle state or in the active state. If the MME finds that the UE hands over in the active state, the MME sends a Relocation Request message to the eNodeB, requesting the eNodeB to create the resource on the access network side. The eNodeB finishes creating the resource on the access network side, and then returns a Relocation Request Acknowledge message to the MME.

10. The MME sends an Update Bearer Request message to the serving GW, requesting to update the downlink user plane path of the serving GW to the eNodeB. The serving GW returns an Update Bearer Response message to the MME.

11. If finding that the UE hands over in the active state, the MME sends a S101 HO Command message to the HRPD AN. The message includes an Attach Accept message and an HO Command message.

12. The HRPD AN sends an HRPD AN L2 message to the UE. The message includes an Attach Accept message and an HO Command message.

13. The UE hands over to the E-UTRAN network, and sends an HO Complete message to the eNodeB.

14. The eNodeB sends a Relocation Complete message to the MME, indicating that the UE has handed over to the E-UTRAN network.

It is worthy of attention that in this embodiment, step 6 may occur before, during or after step 9.

Embodiment 7

Figure 13:
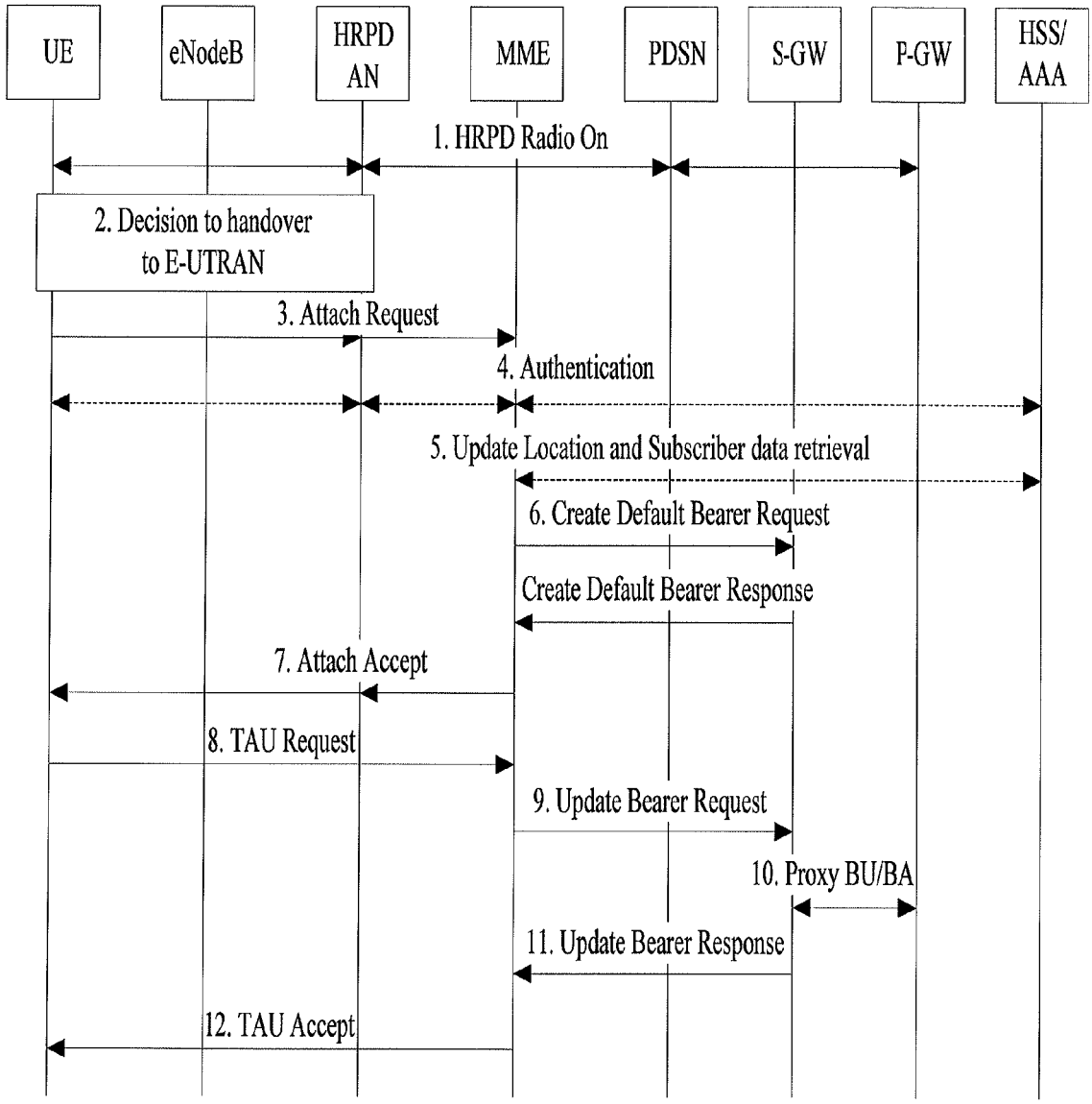
FIG. 13 is a flowchart of the seventh embodiment of the present disclosure.

When the UE hands over from an HRPD network to an E-UTRAN network in the idle mode, the MME obtains the handover processing type of the UE. If determining that the handover processing type is handover in the idle mode, the MME neither notifies the eNodeB to create resource on the access network side nor uses the preliminary path handover mechanism. As illustrated in FIG. 13, the process includes the following steps:

1. The UE accesses the system at the HRPD network.

2. The UE or the HRPD Access Network (AN) decides to perform handover to the 3GPP network.

3. The UE sends an Attach Request message to the MME through the HRPD network. The handover processing type needs to be notified to the MME. The operations are the same as the counterpart in the sixth embodiment, and are not repeated here any further.

4. The authentication procedure is performed.

5. The MME sends an Update Location message to the HSS to obtain the subscriber data of the UE. The HSS returns the subscriber data of the UE, including the PDN GW address used by the UE.

6. The MME selects a serving GW, and sends a Create Default Bearer Request message to the serving GW. According to the information included in the Attach Request message, the MME knows whether the UE hands over in the idle state or in the active state. If the MME finds that the UE hands over in the idle state, the Create Default Bearer Request message sent by the MME does not require the serving GW to perform "preliminary path handover". The serving GW returns a Create Default Bearer Response message to the MME.

7. According to the information included in the Attach Request message, the MME knows whether the UE hands over in the idle state or in the active state. If finding that the UE hands over in the idle state, the MME does not notify the eNodeB to create resource on the access network side, but sends an Attach Accept message to the UE directly through the HRPD network.

8. The UE hands over to the E-UTRAN network, and sends a TAU Request message to the MME, indicating that the UE has handed over to the E-UTRAN network.

9. After finding that the UE has handed over to the E-UTRAN network in the idle state, the MME sends an Update Bearer Request message to the serving GW. The MME adds an indication bit in the Update Bearer Request to require the serving GW to perform user plane path handover.

10. When the serving GW discovers the requirement of user plane path handover after receiving the Update Bearer Request message, the serving GW sends a Proxy BU message to the PDN GW to update the downlink user plane path of the PDN GW. The PDN GW switches the downlink user plane path to the serving GW, and then returns a Proxy BA message to the serving GW.

11. The serving GW returns an Update Bearer Response message to the MME.

12. The MME returns a TAU Accept message to the UE.

Embodiment 8

Figure 14:
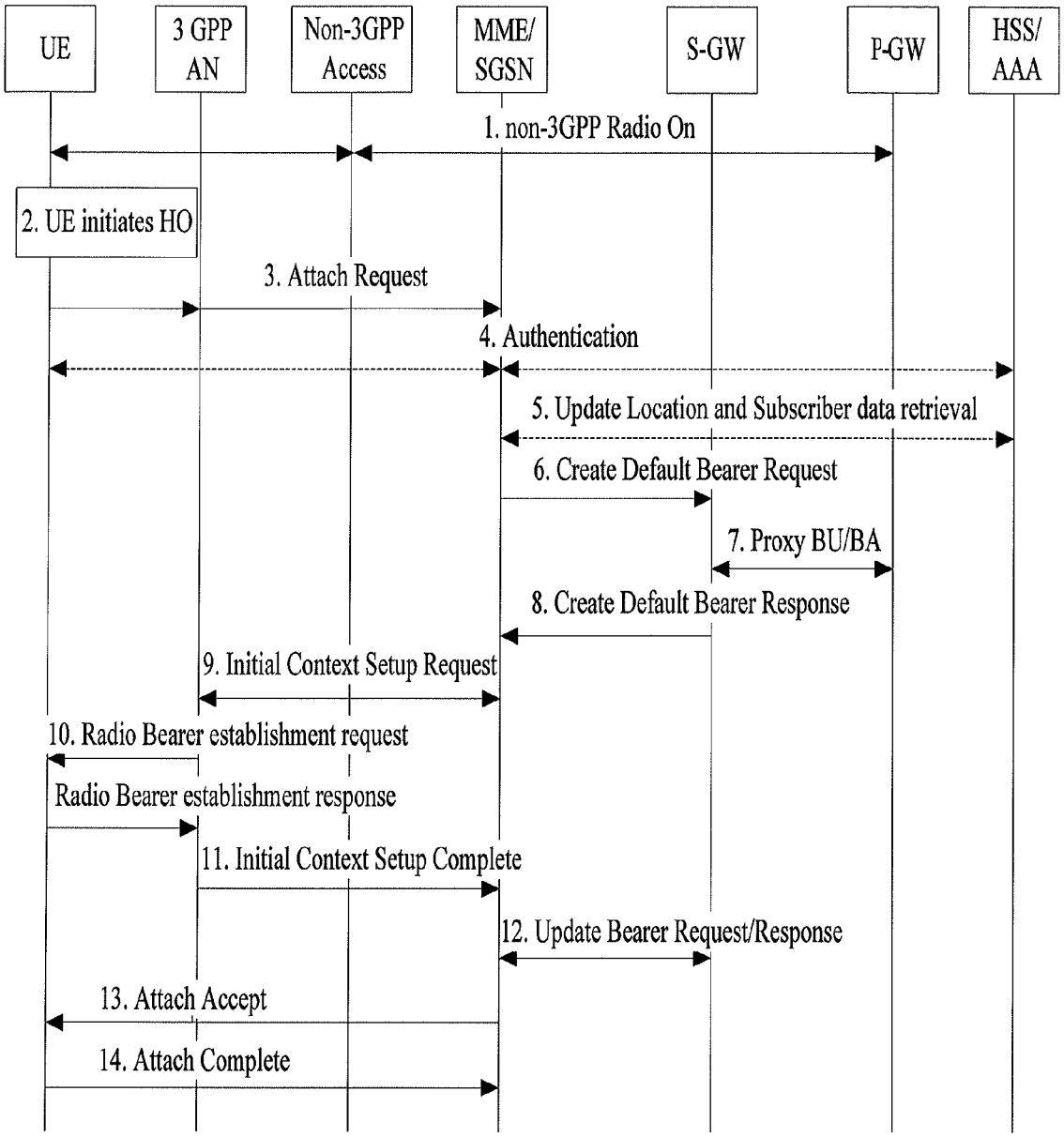
FIG. 14 is a flowchart of the eighth embodiment of the present disclosure.

The method of notifying the handover processing type is also applicable to the normal handover from a non-3GPP network to a 3GPP network. Through an Attach Request message, the UE notifies the handover processing type information to the MME or SGSN. According to the handover processing type information, the MME or SGSN decides whether to notify the access network to create the resource on the access network side. As illustrated in FIG. 14, the process includes the following steps:

1. The UE accesses the system at a non-3GPP network (such as WiMax or WLAN).

2. The UE decides to perform handover to the 3GPP network, and initiates a handover procedure.

3. The UE sends an Attach Request message to a network element of the core network through a 3GPP AN. If the 3GPP AN is a GERAN/UTRAN, the network element of the core network is SGSN; or, if the 3GPP AN is an E-UTRAN, the network element of the core network is MME. The Attach Request message sent by the UE to the MME/SGSN indicates whether the Attach procedure is handover in the idle state or handover in the active state. The MME/SGSN obtains the processing type information. The specific mode of notifying the processing type may be:

✓ The UE adds an Attach Type IE in the Attach Request message to indicate the processing type of the MME/SGSN handover. Different values of the Attach Type indicate different processing types:

0 indicates Idle Mode Handover (handover in the idle mode); or 1 indicates Active Mode Handover (handover in the active mode).

✓ The UE adds a Cause IE in the Attach Request message to indicate the cause for the Attach Request message. The UE may set the following Cause values:

Idle Mode Handover: This cause value indicates that the Attach Request is caused by handover in the idle state; and Active Mode Handover: This cause value indicates that the Attach Request is caused by handover in the active state.

✓ The UE adds a "UE State" IE in the Attach Request message to report the state of the UE. According to the state of the UE, the MME/SGSN knows whether the UE hands over in the idle state or in the active state. The UE may set the following UE State values:

0: indicates that the UE is in the idle state; or

1: indicates that the UE is in the active state.

✓ When the UE hands over in the active state, the UE adds an "active flag" IE in the Attach Request message to indicate the need of creating bearer on the access network side; and when the UE hands over in the idle state, the UE adds no "active flag" IE in the Attach Request message to indicate no need of creating bearer on the access network side. Alternatively, when the UE hands over in the active state, the UE sets the "active flag" IE to "True(1)" to indicate the need of creating bearer on the access network side; and when the UE hands over in the idle state, the UE sets the "active flag" IE to "False(0)" to indicate no need of creating bearer on the access network side.

✓ When the UE hands over in the idle state, the UE adds an "Non-active flag" IE in the Attach Request message to indicate no need of creating bearer on the access network side; and when the UE hands over in the active state, the UE adds no "Non-active flag" IE in the Attach Request message to indicate the need of creating bearer on the access network side. Alternatively, when the UE hands over in the idle state, the UE sets the "Non-active flag" IE to "True(1)" to indicate no need of creating bearer on the access network side; and when the UE hands over in the active state, the UE sets the "Non-active flag" IE to "False(0)" to indicate the need of creating bearer on the access network side.

4. The authentication procedure is performed.

5. The MME/SGSN sends an Update Location message to the HSS to obtain the subscriber data of the UE. The HSS returns the subscriber data of the UE, including the PDN GW address used by the UE.

6. The MME/SGSN selects a serving GW, and sends a Create Default Bearer Request message to the serving GW.

7. The serving GW sends a Proxy BU message to the PDN GW to update the downlink user plane path of the PDN GW. The PDN GW switches the downlink user plane path to the serving GW, and then returns a Proxy BA message to the serving GW.

8. The serving GW returns a Create Default Bearer Response message to the MME/SGSN.

9. According to the information included in the Attach Request message, the MME/SGSN knows whether the UE hands over in the idle state or in the active state. If the MME/SGSN finds that the UE hands over in the active state, steps 9-12 are performed. If the MME/SGSN finds that the UE hands over in the idle state, steps 13-14 are performed.

The MME/SGSN sends an Initial Context Setup Request message to the 3GPP AN, requesting the 3GPP AN to create resource on the access network side. The message includes an Attach Accept message.

10. Radio bearer is created between the 3GPP AN and the UE.

11. The 3GPP AN returns an Initial Context Setup Complete message to the MME/SGSN. This message also includes the Attach Complete message.

12. The MME/SGSN sends an Update Bearer Request message to the serving GW, requesting to update the downlink user plane path to the eNodeB. The serving GW updates the downlink user plane path to the 3GPP AN, and then returns an Update Bearer Response message to the MME/SGSN.

13. If the MME/SGSN finds that the UE hands over in the idle state, the MME/SGSN sends an Attach Accept message to the UE.

14. The UE returns an Attach Complete message to the MME/SGSN.

Embodiment 9

Figure 15:
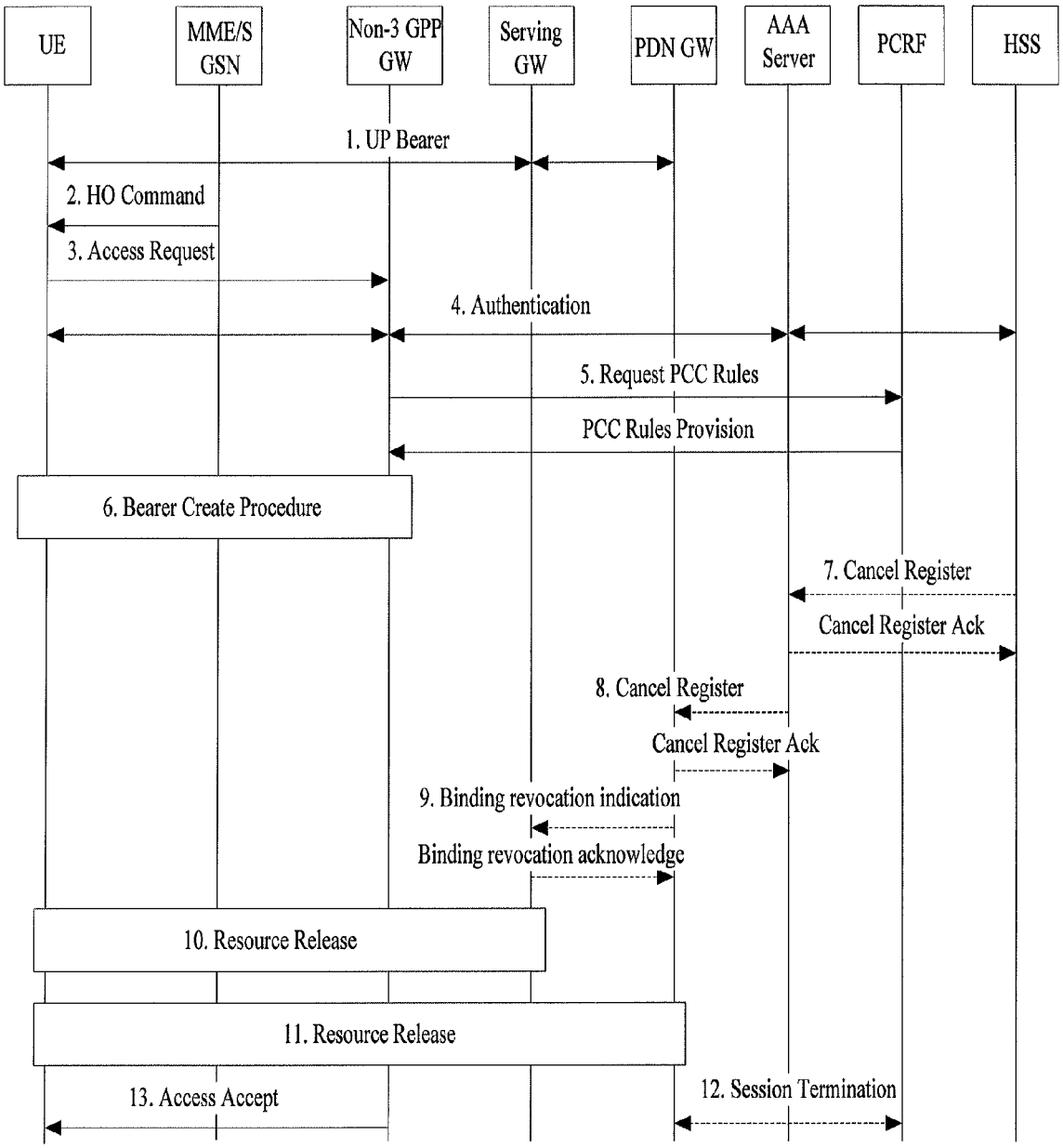
FIG. 15 is a flowchart of the ninth embodiment of the present disclosure.

When the UE sends a registration request message to the non-3GPP GW, the UE reports the registration processing type information to the non-3GPP GW. The non-3GPP GW identifies the processing type of the registration according to the information, and creates bearer for the UE according to registration processing type to complete the registration. The non-3GPP GW reports the registration processing type to the AAA server, and the AAA server reports the registration processing type to the HSS. For the registration caused by handover, the network initiates a bearer creation procedure to create bearer in the non-3GPP network used by the UE in the source 3GPP network. For initialization registration, if the HSS stores the PDN GW address used by the UE in the 3GPP network, the HSS notifies the AAA server to cancel the UE registration in the 3GPP network, and the AAA server notifies the PDN GW to release the resource used by the UE in the 3GPP network. As illustrated in FIG. 15, the process includes the following steps:

1. The UE accesses the 3GPP AN through the serving GW and the PDN GW.

2. The MME or the SGSN sends an HO Command to the UE, notifying the UE to hand over to the non-3GPP network; or the UE discovers the non-3GPP network and decides to initiate handover.

3. Before initiating registration into the non-3GPP network, the UE identifies the type of the registration. Afterward, the UE sends an Access Request message to the non-3GPP GW, and reports the registration processing type to the non-3GPP GW.

4. An authentication procedure is performed between the UE, the non-3GPP GW, the AAA server, and the HSS. In this step, the UE may report the registration processing type to the non-3GPP GW.

In this step, the non-3GPP GW reports the registration processing type to the AAA server and the HSS. If the registration processing type is a handover processing type, the AAA server or HSS may provide the non-3GPP GW with the PDN GW address used by the UE in the 3GPP AN.

In the UE registration process, if the AAA server or HSS identifies the UE registration processing type (for example, the AAA server or HSS finds that it stores the PDN GW address used by the UE in the 3GPP AN, the AAA server or HSS determines that the UE registration processing type is registration caused by handover. Otherwise, the AAA server or HSS determines that the UE registration processing type is a normal registration processing type), the AAA server or HSS adds an indication bit in the message to notify the registration processing type information to the non-3GPP GW. The indication bit may be:

a) a Handover Indication IE. If the UE registration processing type is registration caused by handover, the AAA server or HSS adds a Handover Indication IE. For a normal registration processing type, the AAA server or HSS does not add this IE;

b) a Cause IE. For the registration caused by handover, the AAA server or HSS sets the Cause IE to "Update due to Handover Attach". For normal registration, the AAA server or HSS sets the Cause IE to "Update due to Initial Attach", or does not add the Cause IE; or c) an Update Type IE. For the registration caused by handover, the AAA server or HSS sets this IE to "Handover Attach". For normal registration, the AAA server or HSS sets this IE to "Initial Attach", or does not add this IE.

5. The non-3GPP GW identifies the processing type of the registration according to the registration processing type information reported by the UE, AAA server, or HSS.

Now the non-3GPP GW succeeds in distinguishing between different registration processing types.

Further, if the processing type is normal access, the non-3GPP GW performs the normal access procedure, and steps 7-13 are performed.

If the processing type is access caused by handover, the non-3GPP GW sends a Request PCC Rules message to the PCRF to obtain the PCC rules applied by the user. The PCRF provides the non-3GPP GW with the PCC rules applied by the user, and then the process proceeds to step 6.

6. The non-3GPP GW initiates a network-initiate bearer creation procedure to create the bearer for the user, and then the process proceeds to step 13.

7. If the registration processing type is normal registration and the HSS stores the registered PDN GW addresses, and if such PDN GW addresses are the PDN GW addresses used by the UE when the UE accesses the 3GPP AN, the HSS sends a Cancel Register message to the AAA server, requesting to cancel the UE registration in the AAA server. The AAA server returns a Cancel Register Ack message to the HSS.

8. The AAA server sends a Cancel Register message to the PDN GW, requesting to cancel the UE registration in the 3GPP AN. The PDN GW returns a Cancel Register Ack message to the AAA server.

9. If the interface protocol between the PDN GW and the serving GW is a PMIP, the PDN GW sends a Binding Revocation Indication message to the serving GW to cancel the PMIP binding between the serving GW and the PDN GW. The serving GW returns a Binding Revocation Acknowledge message to the PDN GW.

10. After receiving the Binding Revocation Indication message, the serving GW initiates a resource release procedure to release the resource used by the UE in the 3GPP AN.

11. If the interface protocol between the PDN GW and the serving GW is a GTP, the PDN GW initiates a resource release procedure to release the resource used by the UE in the 3GPP AN.

12. A session abort procedure is performed between the PDN GW and the PCRF, and the PCRF is notified to release the PCC rules applied by the UE in the 3GPP AN.

13. The non-3GPP GW returns an Access Accept message to the UE.

Embodiment 10

Figure 16:
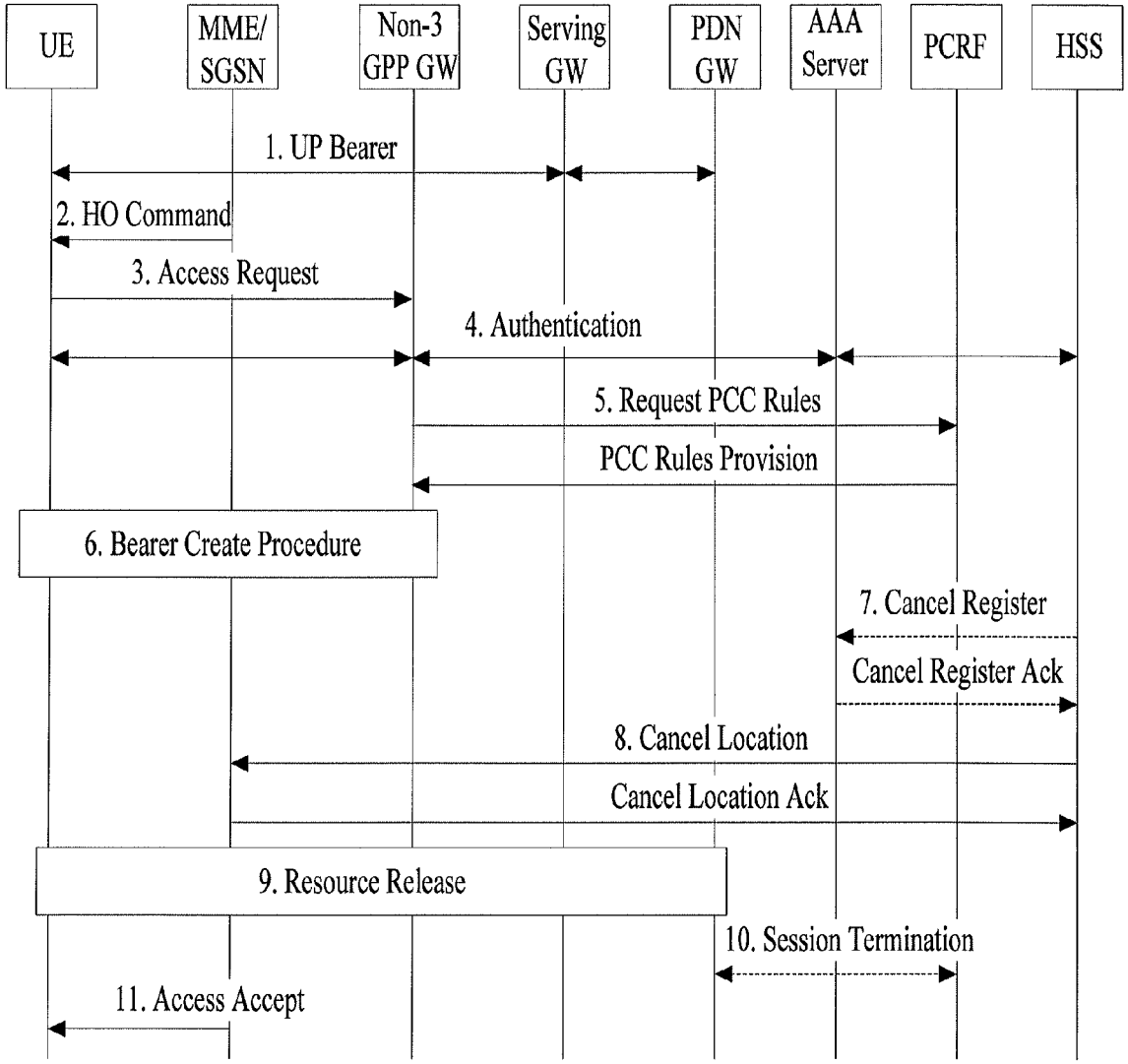
FIG. 16 is a flowchart of the $10^{th}$ embodiment of the present disclosure.

When the UE sends a registration request message to the non-3GPP GW, the UE reports the registration processing type information to the non-3GPP GW. The non-3GPP GW identifies the processing type of the registration according to the information, and creates bearer for the UE according to registration processing type to complete the registration. The non-3GPP GW reports the registration processing type to the AAA server, and the AAA server reports the registration processing type to the HSS. For the registration caused by handover, the network initiates a bearer creation procedure to create bearer in the non-3GPP network used by the UE in the source 3GPP network. For initialization registration, if the HSS stores the PDN GW address used by the UE in the 3GPP network, the HSS notifies the AAA server to cancel the UE registration in the 3GPP network, and the HSS notifies the MME/SGSN to release the resource used by the UE in the 3GPP network. As illustrated in FIG. 16, the process includes the following steps:

Steps 1-6 are the same as the counterpart in the ninth embodiment, and are not repeated here any further.

7. If the UE registration processing type is normal registration and the HSS stores the registered PDN GW addresses, and if such PDN GW addresses are the PDN GW addresses used by the UE when the UE accesses the 3GPP AN, the HSS sends a Cancel Register message to the AAA server, requesting to cancel the UE registration in the AAA server. The AAA server returns a Cancel Register Ack message to the HSS.

8. The HSS sends a Cancel Location message to the MME/SGSN. The MME/SGSN returns a Cancel Location Ack message to the HSS.

9. The MME/SGSN separates the UE to release the resource used by the UE in the 3GPP AN.

10. A session abort procedure is performed between the PDN GW and the PCRF, and the PCRF is notified to release the PCC rules applied by the UE in the 3GPP AN.

11. The non-3GPP GW returns an Access Accept message to the UE.

Embodiment 11

Figure 17:
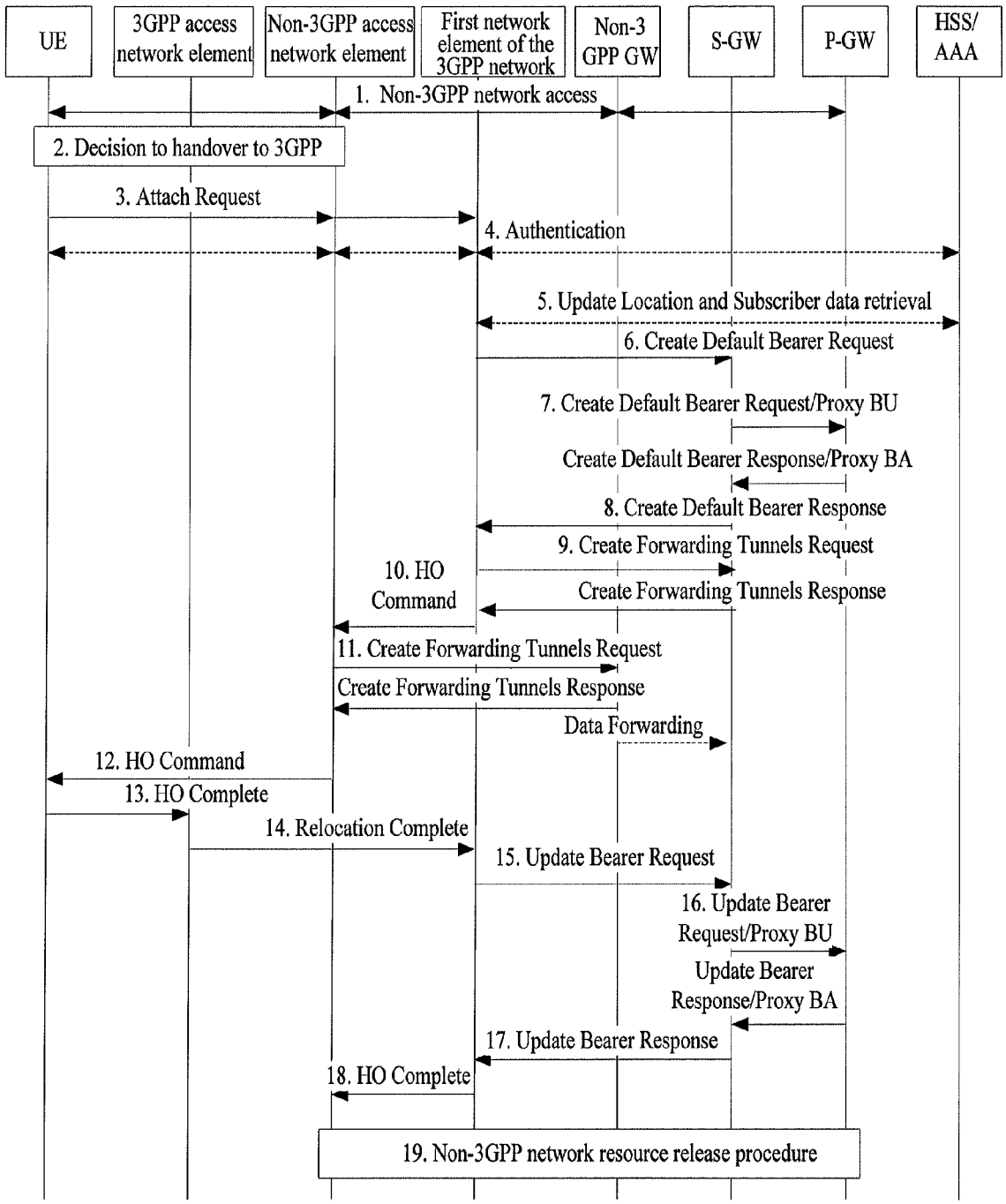
FIG. 17 is a flowchart of the $11^{th}$ embodiment of the present disclosure.

When the UE hands over from a non-3GPP network to a 3GPP network in the active mode, the first network element of the 3GPP network obtains the handover processing type. If determining that the handover processing type is handover in the active mode, the first network element of the 3GPP network notifies the PDN GW not to initiate the resource release procedure in the source non-3GPP network, and notifies the serving GW to create a data forwarding tunnel between the serving GW and the non-3GPP GW. As illustrated in FIG. 17, the process includes the following steps:

1. The UE accesses the system at the non-3GPP network.

2. The UE or the non-3GPP access network element (for an HRPD network, the non-3GPP access network element is an HRPD Radio Network Controller (RNC)) decides to perform handover to the 3GPP network.

3. Through the non-3GPP network, the UE sends an Attach Request message to the first network element of the 3GPP network (for the E-UTRAN network, the first network element of the 3GPP network is an MME; for the GERAN/UTRAN network, the first network element of the 3GPP network is an SGSN). The first network element of the 3GPP network obtains the processing type information. The first network element of the 3GPP network may obtain the processing type information in one of the following ways:

(1) The UE reports the processing type information: The Attach Request message sent by the UE to the first network element of the 3GPP network indicates whether the Attach procedure is handover in the idle state or handover in the active state. The specific mode of notifying the processing type may be:

✓ The UE adds an Attach Type IE into the Attach Request message to indicate the handover processing type to the MME. Different values of the Attach Type indicate different processing types:

0 indicates Idle Mode Handover (handover in the idle mode); or 1 indicates Active Mode Handover (handover in the active mode); or For optimized handover or pre-registration in the active state, the UE sets the Attach Type IE in the Attach Request message to "Optimized Handover" or "Pre-registration" or "Handover". After receiving the Attach Type, the first network element of the 3GPP network believes that the Attach procedure is handover in the active state by default.

✓ The UE adds a Cause IE in the Attach Request message to indicate the cause for the Attach Request message. The UE may set the following Cause values:

Idle Mode Handover: This cause value indicates that the Attach Request is caused by handover in the idle state; or Active Mode Handover: This cause value indicates that the Attach Request is caused by handover in the active state.

✓ The UE adds a UE State" IE in the Attach Request message to report the state of the UE. According to the state of the UE, the MME knows whether the UE hands over in the idle state or in the active state. The UE may set the following UE State values:

0: indicates that the UE is in the idle state; or

1: indicates that the UE is in the active state.

✓ When the UE hands over in the active state, the UE adds an "active flag" IE in the Attach Request message to indicate the need of creating bearer on the access network side; and when the UE hands over in the idle state, the UE adds no "active flag" IE in the Attach Request message to indicate no need of creating bearer on the access network side. Alternatively, when the UE hands over in the active state, the UE sets the "active flag" IE to "True(1)" to indicate the need of creating bearer on the access network side; and when the UE hands over in the idle state, the UE sets the "active flag" IE to "False(0)" to indicate no need of creating bearer on the access network side.

✓ When the UE hands over in the idle state, the UE adds an "Non-active flag" IE in the Attach Request message to indicate no need of creating bearer on the access network side; and when the UE hands over in the active state, the UE adds no "Non-active flag" IE in the Attach Request message to indicate the need of creating bearer on the access network side. Alternatively, when the UE hands over in the idle state, the UE sets the "Non-active flag" IE to "True(1)" to indicate no need of creating bearer on the access network side; and when the UE hands over in the active state, the UE sets the "Non-active flag" IE to "False(0)" to indicate the need of creating bearer on the access network side.

(2) The non-3GPP access network element or the non-3GPP GW reports the processing type information: The non-3GPP access network element or the non-3GPP GW sends an interface message to the first network element of the 3GPP network to indicate whether the Attach procedure is handover in the idle state or handover in the active state. The specific mode of notifying the processing type may be:

✓ The non-3GPP access network element or the non-3GPP GW adds an Attach Type IE into the interface message sent to the first network element of the 3GPP network to indicate the handover processing type. Different values of the Attach Type indicate different processing types:

0 indicates Idle Mode Handover (handover in the idle mode); or 1 indicates Active Mode Handover (handover in the active mode); or For optimized handover or pre-registration in the active state, the non-3GPP access network element or the non-3GPP GW sets the Attach Type IE to "Optimized Handover" or "Pre-registration" or "Handover". After receiving the Attach Type, the first network element of the 3GPP network believes that the Attach procedure is handover in the active state by default.

✓ The non-3GPP access network element or the non-3GPP GW adds a Cause IE in the interface message sent to the first network element of the 3GPP network to indicate the cause for the Attach Request message. The non-3GPP access network element or the non-3GPP GW may set the following Cause values:

Idle Mode Handover: This cause value indicates that the Attach Request is caused by handover in the idle state; or Active Mode Handover: This cause value indicates that the Attach Request is caused by handover in the active state.

✓ The non-3GPP access network element or the non-3GPP GW adds a "UE State" IE in the interface message sent to the first network element of the 3GPP network to report the UE state. According to the state of the UE, the first network element of the 3GPP network knows whether the UE hands over in the idle state or in the active state. The UE may set the following UE State values:

0: indicates that the UE is in the idle state; or

1: indicates that the UE is in the active state.

✓ When the UE hands over in the active state, the non-3GPP access network element or the non-3GPP GW adds an "active flag" IE in the interface message sent to the first network element of the 3GPP network to indicate the need of creating bearer on the access network side. When the UE hands over in the idle state, the non-3GPP access network element or the non-3GPP GW adds no "active flag" IE in the interface message sent to the first network element of the 3GPP network to indicate no need of creating bearer on the access network side.

✓ When the UE hands over in the idle state, the non-3GPP access network element or the non-3GPP GW adds a "Non-active flag" IE in the interface message sent to the first network element of the 3GPP network to indicate no need of creating bearer on the access network side. When the UE hands over in the active state, the non-3GPP access network element or the non-3GPP GW adds no "Non-active flag" IE into the interface message sent to the first network element of the 3GPP network to indicate the need of creating bearer on the access network side.

4. The authentication procedure is performed.

5. The first network element of the 3GPP network sends an Update Location message to the HSS to obtain the subscriber data of the UE. The HSS returns the subscriber data of the UE, including the PDN GW address used by the UE.

6. The first network element of the 3GPP network selects a serving GW, and sends a Create Default Bearer Request message to the serving GW.

7. If the interface protocol between the serving GW and the PDN GW is a GTP, the serving GW sends a Create Default Bearer Request message to the PDN GW. If the interface protocol between the serving GW and the PDN GW is a PMIP, the serving GW sends a Proxy BU message to the PDN GW. The PDN GW returns a Create Default Bearer Response message or a Proxy BA message to the serving GW.

8. The serving GW returns a Create Default Bearer Response message to the first network element of the 3GPP network.

9. If finding that the UE hands over in the active state, the first network element of the 3GPP network sends a Create Forwarding Tunnels Request to the serving GW, requesting the serving GW to create a forwarding tunnel. The serving GW returns a Create Forwarding Tunnels Response message to the first network element of the 3GPP network. The message includes the forwarding tunnel information (including a serving GW address and Generic Routing Encapsulation (GRE) Keys).

10. If finding that the UE hands over in the active state, the first network element of the 3GPP network sends an HO Command message to the non-3GPP access network element or the non-3GPP GW. The message includes an Attach Accept message, an HO Command message, and forwarding tunnel information (including a serving GW address and GRE Keys).

11. After receiving the HO Command message, the non-3GPP access network element sends a Create Forwarding Tunnels Request message to the non-3GPP GW, notifying the non-3GPP GW of the obtained forwarding tunnel information. The non-3GPP GW returns a Create Forwarding Tunnels Response message to the non-3GPP access network element.

Subsequently, the non-3GPP GW forwards the received downlink data to the serving GW through the forwarding tunnel (including a serving GW address and GRE keys).

12. The non-3GPP access network element or the non-3GPP GW sends an HO Command message to the UE. The message includes an Attach Accept message and an HO Command message.

13. The UE hands over to the 3GPP network, and sends an HO Complete message to the 3GPP access network element.

14. The 3GPP access network element sends a Relocation Complete message to the first network element of the 3GPP network, indicating that the UE has handed over to the 3GPP network.

15. The first network element of the 3GPP network sends an Update Bearer Request message to the serving GW. If finding that the UE hands over in the active state, the first network element of the 3GPP network adds an indication bit in the Update Bearer Request message to indicate the PDN GW not to initiate a resource release procedure to release the resource used by the UE in the source non-3GPP AN. This indication bit may be: Optimized Handover Indication, Pre-registration Indication, or Resource not Release Indication. Specifically, the indication bit may be:

(1) an Update Type indication bit. The first network element on the network side sets the Update Type indication bit to "Pre-registration" or "Optimized Handover";

(2) a Cause value. The first network element on the network side sets the Cause value to "Pre-registration", "Optimized Handover" or "Resource not Release"; or (3) a Pre-registration Indication, or Optimized Handover Indication, or Resource not Release Indication.

16. If the interface protocol between the serving GW and the PDN GW is GTP, the serving GW sends an Update Bearer Request message to the PDN GW. If the interface protocol between the serving GW and the PDN GW is PMIP, the serving GW sends a Proxy BU message to the PDN GW. The serving GW adds an indication bit in the Update Bearer Request message or the Proxy BU message to indicate the PDN GW not to initiate a resource release procedure to release the resource used by the UE in the source non-3GPP AN. This indication bit may be: Optimized Handover Indication, Pre-registration Indication, or Resource not Release Indication. Specifically, the indication bit may be:

(1) an Update Type indication bit, or a Binding Type indication bit. The serving GW sets the Update Type indication bit or the Binding Type indication bit to "Pre-registration" or "Optimized Handover";

(2) a Cause value. The serving GW sets the Cause value to "Pre-registration", "Optimized Handover", or "Resource not Release"; or (3) a Pre-registration Indication, or Optimized Handover Indication, or Resource not Release Indication.

After receiving the foregoing message, the PDN GW does not initiate the resource release procedure to release the resource used by the UE in the source non-3GPP AN (namely, the resource release procedure to release the resource used by the UE in the source non-3GPP AN is not triggered by the PDN GW). The PDN GW returns an Update Bearer Response message or a Proxy BA message to the serving GW.

17. The serving GW returns an Update Bearer Response message to the first network element of the 3GPP network.

18. After receiving the Relocation Complete message from the eNodeB, the first network element of the 3GPP network returns an HO Complete message to the non-3GPP access network element or the non-3GPP GW.

19. After receiving the HO Complete message from the first network element of the 3GPP network, the non-3GPP access network element or the non-3GPP GW initiates a resource release procedure to release the resource in the source non-3GPP AN.

Note:

1. In this embodiment, step 6 may occur before, during or after step 9; and

2. This embodiment does not limit the message in step 9 and step 11. For example, for the HRPD network, the message in step 11 may also be an A11-Registration Request message.

Embodiment 12

Figure 18:
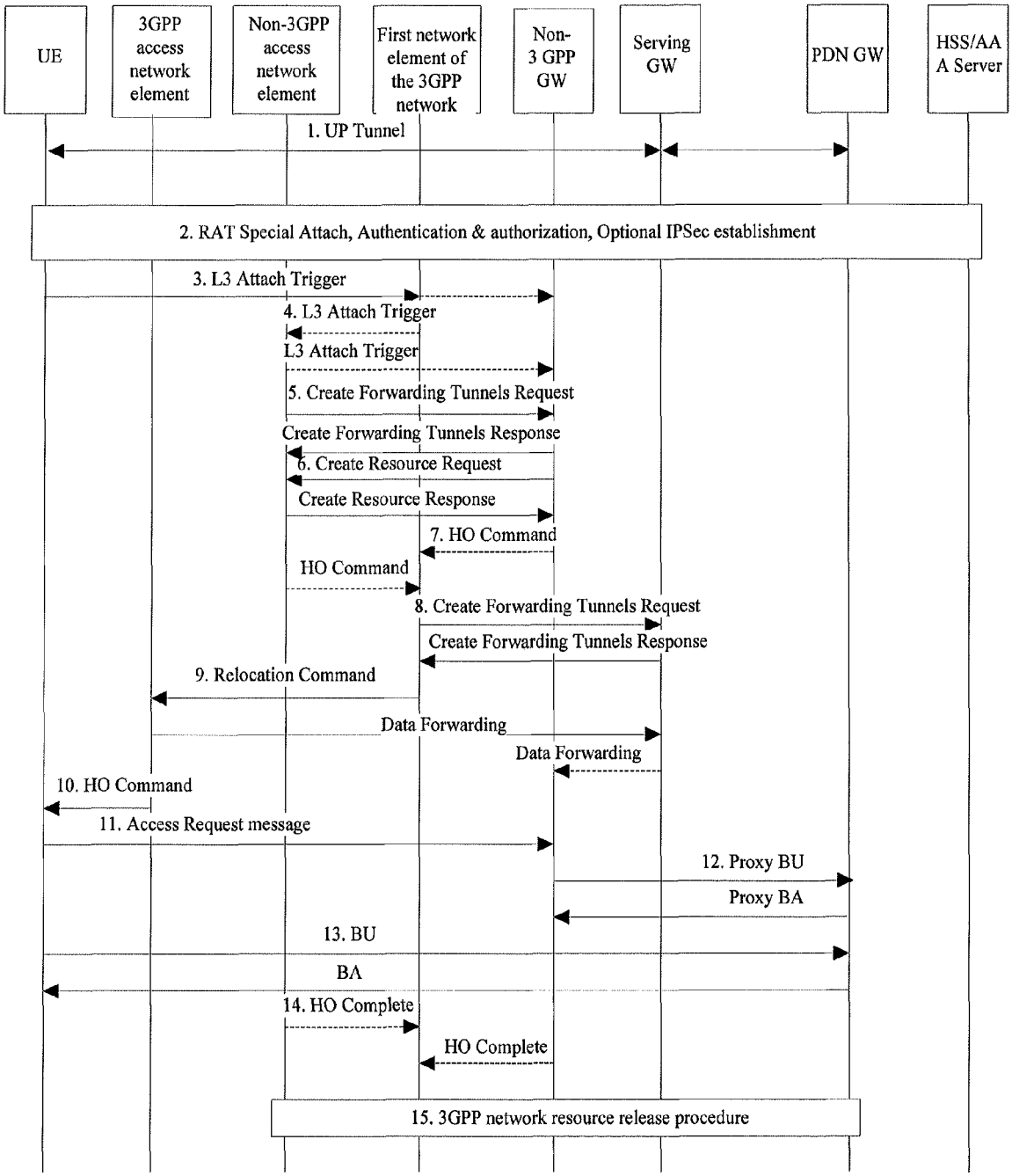
FIG. 18 is a flowchart of the $12^{th}$ embodiment of the present disclosure.

When the UE hands over from a 3GPP network to a non-3GPP network in the active mode, the network element in the non-3GPP network obtains the handover processing type. If determining that the handover processing type is handover in the active mode, the network element in the non-3GPP network creates access network resource and a data forwarding resource, and notifies the PDN GW not to initiate resource release procedure to release the resource on the source side. As illustrated in FIG. 18, the process includes the following steps:

1. The UE accesses the 3GPP network through the serving GW and the PDN GW.

2. Through the 3GPP network, the UE performs the Attach procedure and the authentication procedure which are specific to the non-3GPP network.

3. Through the 3GPP network, the UE triggers a layer-3 Attach procedure in the non-3GPP network. The access network (for example, RNC in the HRPD network) or the non-3GPP GW (for example, PDSN in the HRPD network) in the non-3GPP network obtains the handover processing type information. The access network or the non-3GPP GW in the non-3GPP network obtains the handover processing type information in one of the following ways:

(1) The UE reports the processing type information: The message of the layer-3 Attach procedure sent by the UE to the access network or the non-3GPP GW in the non-3GPP network indicates whether the procedure is handover in the idle state or handover in the active state. The specific mode of notifying the processing type may be:

✓ The UE adds an Attach Type IE in the message of the layer-3 Attach procedure sent to the access network or the non-3GPP GW in the non-3GPP network, and this IE indicates the handover processing type. Different values of the Attach Type indicate different processing types:

0 indicates Idle Mode Handover (handover UE in the idle mode); or 1 indicates Active Mode Handover (handover in the active mode); or For optimized handover or pre-registration in the active state, the UE sets the Attach Type IE in the message of the layer-3 Attach procedure to "Optimized Handover", or "Pre-registration", or "Handover". After receiving the Attach Type, the access network or the non-3GPP GW in the non-3GPP network believes that the layer-3 Attach procedure is handover of the UE in the active state by default.

✓ The UE adds a Cause IE in the message of the layer-3 Attach procedure to indicate the cause for the message of the layer-3 Attach procedure. The UE may set the following Cause values:

Idle Mode Handover: This cause value indicates that the message of the layer-3 Attach procedure is caused by handover in the idle state; or Active Mode Handover: This cause value indicates that the message of the layer-3 Attach procedure is caused by handover in the active state.

✓ The UE adds a "UE State" IE in the message of the layer-3 Attach procedure message to report the state of the UE. According to the state of the UE, the access network or the non-3GPP GW in the non-3GPP network knows whether the UE hands over in the idle state or in the active state. The UE may set the following UE State values:

0: indicates that the UE is in the idle state; or

1: indicates that the UE is in the active state.

✓ When the UE hands over in the active state, the UE adds an "active flag" IE in the message of the layer-3 Attach procedure message to indicate the need of creating bearer on the access network side; and when the UE hands over in the idle state, the UE adds no "active flag" IE in the message of the layer-3 Attach procedure message to indicate no need of creating bearer on the access network side. Alternatively, when the UE hands over in the active state, the UE sets the "active flag" IE to "True(1)" to indicate the need of creating bearer on the access network side; and when the UE hands over in the idle state, the UE sets the "active flag" IE to "False(0)" to indicate no need of creating bearer on the access network side.

✓ When the UE hands over in the idle state, the UE adds a "Non-active flag" IE in the message of the layer-3 Attach procedure message to indicate no need of creating bearer on the access network side; and when the UE hands over in the active state, the UE adds no "Non-active flag" IE in the message of the layer-3 Attach procedure message to indicate the need of creating bearer on the access network side. Alternatively, when the UE hands over in the idle state, the UE sets the "Non-active flag" IE to "True(1)" to indicate no need of creating bearer on the access network side; and when the UE hands over in the active state, the UE sets the "Non-active flag" IE to "False(0)" to indicate the need of creating bearer on the access network side.

(2) The first network element of the 3GPP network reports the processing type: The interface message sent by the first network element of the 3GPP network to the access network or the non-3GPP GW in the non-3GPP network indicates whether the layer-3 Attach procedure is handover in the idle state or handover in the active state. The specific mode of notifying the processing type may be:

✓ The first network element of the 3GPP network adds an Attach Type IE in the interface message sent to the access network or the non-3GPP GW in the non-3GPP network. This IE indicates the handover processing type. Different values of the Attach Type indicate different processing types:

0 indicates Idle Mode Handover (handover in the idle mode); or 1 indicates Active Mode Handover (handover in the active mode).

For optimized handover or pre-registration of the UE in the active state, the first network element of the 3GPP network sets the Attach Type IE to "Optimized Handover", or "Pre-registration", or "Handover". After receiving the Attach Type, the access network or the non-3GPP GW in the non-3GPP network believes that the layer-3 Attach procedure is handover in the active state by default.

✓ The first network element of the 3GPP network adds a Cause IE in the interface message sent to the access network or the non-3GPP GW in the non-3GPP network to indicate the cause for the layer-3 Attach procedure message. The first network element of the 3GPP network may set the following Cause values:

Idle Mode Handover: This cause value indicates that the message of the layer-3 Attach procedure is caused by handover in the idle state; or Active Mode Handover: This cause value indicates that the message of the layer-3 Attach procedure is caused by handover in the active state.

✓ The first network element of the 3GPP network adds a UE State" IE in the interface message sent to the access network or the non-3GPP GW in the non-3GPP network to report the UE state. According to the state of the UE, the access network or the non-3GPP GW in the non-3GPP network knows whether the UE hands over in the idle state or in the active state. The UE may set the following UE State values:

0: indicates that the UE is in the idle state; or

1: indicates that the UE is in the active state.

✓ When the UE hands over in the active state, the first network element of the 3GPP network adds an "active flag" IE in the interface message sent to the access network or the non-3GPP GW in the non-3GPP network to indicate the need of creating bearer on the access network side. When the UE hands over in the idle state, the first network element of the 3GPP network adds no "active flag" IE in the interface message sent to the access network or the non-3GPP GW in the non-3GPP network to indicate no need of creating bearer on the access network side.

✓ When the UE hands over in the idle state, the first network element of the 3GPP network adds a "Non-active flag" IE in the interface message sent to the access network or the non-3GPP GW in the non-3GPP network to indicate no need of creating bearer on the access network side. When the UE hands over in the active state, the first network element of the 3GPP network adds no "Non-active flag" IE in the interface message sent to the access network or the non-3GPP GW in the non-3GPP network to indicate the need of creating bearer on the access network side.

It is worthy of attention that:

The access network or the non-3GPP GW in the non-3GPP network may also obtain the handover processing type information in step 2. The specific processing mode is the same as that in step 3.

4. If finding that the UE hands over in the active state, the non-3GPP AN sends a Create Forwarding Tunnels Request message to the non-3GPP GW to request data forwarding resources.

5. The non-3GPP GW returns a Create Forwarding Tunnels Response message to the non-3GPP AN. The message includes the data forwarding tunnel information (for example, for the HRPD network, the data forwarding tunnel information is a PDSN address and a PDSN GRE key) of the non-3GPP GW.

6. If finding that the UE hands over in the active state, the non-3GPP GW sends a Create Resource Request message to the non-3GPP access network element, requesting to create resource on the access network side. The non-3GPP access network element allocates the resource on the access network side, and returns a Create Resource Response message to the non-3GPP GW.

7. If finding that the UE hands over in the active state, the non-3GPP access network element or the non-3GPP GW sends an HO Command message to the first network element of the 3GPP network. The message includes the data forwarding tunneling information of the non-3GPP GW.

8. After receiving the HO Command, the first network element of the 3GPP network sends a Create Forwarding Tunnels Request message to the serving GW, requesting the serving GW to create data forwarding tunnel. The message includes the data forwarding tunnel information of the non-3GPP GW. The serving GW creates data forwarding tunnel, and returns a Create Forwarding Tunnels Response message to the first network element of the 3GPP network.

9. The first network element of the 3GPP network sends a Relocation Command message to the 3GPP access network element.

The 3GPP access network element forwards the received downlink data packet to the serving GW, and the serving GW forwards the received packet to the non-3GPP GW.

10. The 3GPP AN sends an HO Command message to the UE, requesting the UE to hand over to the non-3GPP network.

11. The UE hands over to the non-3GPP network, and sends an access message to notify the network element in the non-3GPP network that the UE has handed over to the non-3GPP network. The specific access message depends on the non-3GPP network. For example, for an HRPD network, the access message is HRPD Traffic Channel Complete (TCC) message.

12. If the interface protocol between the non-3GPP GW and the PDN GW is PMIP, the non-3GPP GW sends a Proxy BU message to the PDN GW. If finding that the UE hands over in the active state, the non-3GPP GW adds an indication bit in the Proxy BU message to indicate the PDN GW not to initiate a resource release procedure to release the resource used by the UE in the source 3GPP network. This indication bit may be: Optimized Handover Indication, Pre-registration Indication, or Resource not Release Indication. The specific processing mode of the indication bit is the same as that in the $11^{th}$ embodiment.

After receiving the foregoing message, the PDN GW does not initiate the resource release procedure to release the resource used by the UE in the source 3GPP AN (namely, the resource release procedure to release the resource used by the UE in the source 3GPP AN is not triggered by the PDN GW). The PDN GW returns a Proxy BA message to the non-3GPP GW.

13. If the interface protocol between the UE and the PDN GW is host-based mobility protocol such as Dual Stack MIPv6 (DSMIPv6), the UE sends a Binding Update (BU) message to the PDN GW. If finding that the UE hands over in the active state, the UE adds an indication bit in the BU message to indicate the PDN GW not to initiate a resource release procedure to release the resource used by the UE in the source 3GPP AN. This indication bit may be: Optimized Handover Indication, Pre-registration Indication, or Resource not Release Indication. The specific processing mode of the indication bit is the same as that in the $11^{th}$ embodiment.

After receiving the foregoing message, the PDN GW does not initiate the resource release procedure to release the resource used by the UE in the source 3GPP AN (namely, the resource release procedure to release the resource used by the UE in the source 3GPP AN is not triggered by the PDN GW). The PDN GW returns a Binding Ack (BA) message to the UE.

14. The non-3GPP access network element or the non-3GPP GW sends an HO Complete message to the first network element of the 3GPP network.

15. After receiving the HO Complete message, the first network element of the 3GPP network initiates the resource release procedure to release the resource used by the UE in the source 3GPP network.

It is worthy of attention that:

This embodiment does not limit the message in step 5 and step 8. For example, for the HRPD network, the message in step 5 may also be an A11-Registration Request message.

Embodiment 13

Figure 19:
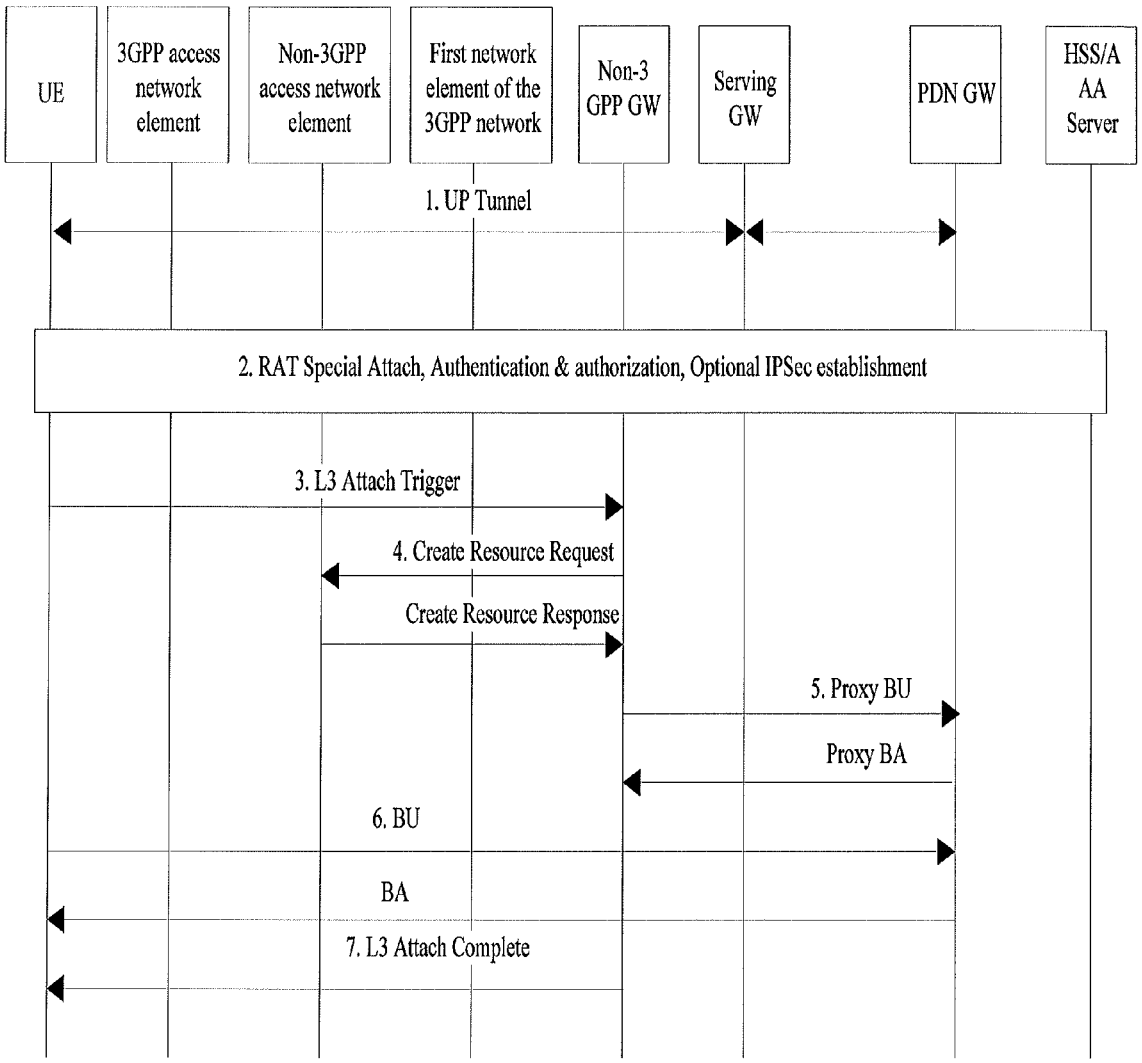
FIG. 19 is a flowchart of the $13^{th}$ embodiment of the present disclosure.

The method of notifying the handover processing type is also applicable to the normal handover from a 3GPP network to a non-3GPP network. Through an Access message of the non-3GPP network, the UE notifies the handover processing type information to the non-3GPP GW. According to the handover processing type, the non-3GPP GW decides whether to notify the access network to create the resource on the access network side. As illustrated in FIG. 19, the process includes the following steps:

1. The UE accesses the 3GPP network through the serving GW and the PDN GW.

2. The UE hands over to the non-3GPP network, and performs the Attach procedure and the authentication procedure which are specific to the non-3GPP network.

3. Through the access network element of the non-3GPP network, the UE triggers a layer-3 Attach procedure in the non-3GPP network. The non-3GPP GW (such as the PDSN in the HRPD network) obtains the handover processing type information. The non-3GPP GW may obtain the processing type information in the following way:

The UE reports the processing type information: The message of the layer-3 Attach procedure sent by the UE to the non-3GPP GW indicates whether the procedure is handover in the idle state or handover in the active state. The specific mode of notifying the processing type information is the same as that in the $6^{th}$ embodiment.

It is worthy of attention that:

The non-3GPP GW may also obtain the handover processing type information in step 2. The specific processing mode is the same as that in step 3.

4. If finding that the UE hands over in the active state, the non-3GPP GW sends a Create Resource Request message to the non-3GPP access network element, requesting to create resource on the access network side. The non-3GPP access network element allocates the resource on the access network side, and returns a Create Resource Response message to the non-3GPP GW.

5. If the interface protocol between the non-3GPP GW and the PDN GW is PMIP, the non-3GPP GW sends a Proxy BU message to the PDN GW. The PDN GW returns a Proxy BA message to the non-3GPP GW.

6. If the interface protocol between the UE and the PDN GW is Client Mobile Internet Protocol (CMIP), the UE sends a BU message to the PDN GW. The PDN GW returns a BA message to the UE.

7. The non-3GPP GW returns a layer-3 Attach Complete message to the UE.

To sum up, through the embodiments of the present disclosure, the network-side network element is configured to perform discriminative processing after obtaining the UE registration processing type information, thus overcoming the inability of processing discriminatively according to different registration procedures in the prior art.

It is apparent that those skilled in the art can make modifications and variations to the present disclosure without departing from the spirit and scope of the present disclosure. The present disclosure is intended to cover the modifications and variations provided that they fall in the scope of protection defined by the following claims or their equivalents.

What is claimed is:

1. A registration processing method, comprising:

[identifying, by a user equipment (UE), a registration type when registering into a network;]

*accessing, by a user equipment (UE), a non-3rd Generation Partnership Project (non-3GPP) network;*

*adding, by the UE, a Type information element (IE) to an Attach Request message in response to a handover from the non-3GPP network to a 3rd Generation Partnership Project (3GPP) network;*

[reporting,] *sending,* by the UE, [a registration processing type information corresponding to the identified registration type to a network-side network element during registering into the network, wherein the registration processing type information reported by the UE is an Type information element (IE) in an Attach Request message, the values of which] *the Attach Request message to a Mobility Management Entity (MME) in the 3GPP network, wherein a value of the* Type IE *in the Attach Request message* corresponds to Handover Attach and indicates that the Attach Request message is caused by handover[when the UE finds that the registration is caused by handover between a non 3rd Generation Partnership Project (non-3GPP) network and a 3rd Generation Partnership (3GPP) network].

2. The method of claim 1, [wherein the method further comprises:

for a registration caused by handover, the network-side network element initiates] *wherein the Type IE in the Attach Request message indicates the 3GPP network to initiate* a bearer creation procedure to [create resources] *re-create* in [a target Third Generation Partnership Project (3GPP)] *the 3GPP* network, *resources* used by the UE in [a source] *the* non-3GPP network[, or to create resources in a target non-3GPP network used by the UE in a source 3GPP network].

3. The method of claim 2, [wherein the network-side network element is a Mobility Management Entity (MME), or a Serving GPRS Supporting Node (SGSN), the network-side network element initiates a bearer creation procedure to create resources in a target 3GPP network used by the UE in a source non-3GPP network comprises:

obtaining, by the MME, a Packet Data Network Gateway (PDN GW) address used by the UE in the source non-3GPP;

sending a Create Bearer Request message to the obtained PDN GW address to request the network to initiate the bearer creation procedure.]

*wherein the 3GPP network is a GSM/EDGE radio access network (GERAN), a UMTS terrestrial radio access network (UTRAN), or an Evolved UMTS Terrestrial Radio Access Network (E-UTRAN), and*

*wherein the non-3GPP network is a Wireless Local Area Network (WLAN) or a Worldwide Interoperability for Microwave Access (WiMAX) network.*

[4. The method of claim 3, further comprising:

sending, by the PDN GW, a Request Policy and Charging Control (PCC) Rules message to a Policy and Charging Rule Function (PCRF) to obtain the PCC rules applied by the UE;

providing, by the PCRF, the PDN GW with the PCC rules applied by the UE.]

[5. The method of claim 4, further comprising:

initiating, by the PDN GW, a network-initiate bearer creation procedure to create the bearer of the UE.]

6. A User Equipment (UE), comprising:

[an identifying unit, configured to identify a registration type when the UE initiates the registration;

a registration initiating unit, configured to initiate registration and send a registration triggering signal; and a reporting unit, configured to receive the registration triggering signal from the registration initiating unit, and report processing type information during registering the UE into the network, wherein the processing type information corresponds to the registration type identified by the identifying unit, and the registration processing type information is an Type information element (IE) in an Attach Request message, the values of which]

*a memory storing instructions; and*

*one or more processors in communication with the memory, wherein the one or more processors execute the instructions to:*

*access a non-3rd Generation Partnership Project (non-3GPP) network;*

*add a Type information element (IE) to an Attach Request message in response to a handover from the non-3GPP network to a 3rd Generation Partnership Project (3GPP) network; and*

*send the Attach Request message to a Mobility Management Entity (MME) in the 3GPP network;*

*wherein a value of the* Type IE *in the Attach Request message* corresponds to Handover Attach and indicates that the Attach Request message is caused by handover[, when the registration is caused by handover between a non 3rd Generation Partnership Project (non-3GPP) network and a 3rd Generation Partnership (3GPP) network].

*7. A method, comprising:*

*receiving, by a mobility management entity (MME), an attach request message from a user equipment (UE) in response to a handover from a non-3rd Generation Partnership Project (non-3GPP) network to a 3rd Generation Partnership Project (3GPP) network, wherein the attach request message comprises an information element (IE) indicating handover;*

*identifying, by the MME, a packet data network gateway (PDN GW) used by the UE in the non-3GPP network according to the IE indicating handover; and*

*sending, by the MME, a create bearer request for creating a bearer to the PDN GW.*

*8. The method of claim 7, wherein the MME sends the create bearer request to the PDN GW for requesting the PDN GW to create a bearer.*

*9. The method of claim 7, wherein the MME identifies the PDN GW by obtaining a PDN GW address from a home subscriber server (HSS).*

*10. A mobility management entity, comprising:*

*a receiver configured to receive an attach request message from a user equipment (UE) in response to a handover from a non-3rd Generation Partnership Project (non-3GPP) network to a 3rd Generation Partnership Project (3GPP) network, wherein the attach request message comprises an information element (IE) indicating handover;*

*a processor communicatively coupled to the receiver and configured to identify a packet data network gateway (PDN GW) used by the UE in the non-3GPP network according to the IE indicating handover; and*

*a transmitter configured to send a create bearer request for creating a bearer to the PDN GW.*

*11. The mobility management entity of claim 10, wherein the create bearer request is configured to request the PDN GW to create a bearer.*

*12. The mobility management entity of claim 10, wherein the processor is configured to identify the PDN GW by a PDN GW address received from a home subscriber server (HSS).*

*13. A communication system, comprising:*

*a packet data network gateway (PDN GW); and*

*a mobility management entity (MME), configured to:*

*receive an attach request message from a user equipment (UE) in response to a handover from a non-3rd Generation Partnership Project (non-3GPP) network to a 3rd Generation Partnership Project (3GPP) network, wherein the attach request message comprises an information element (IE) indicating handover;*

*identify the PDN GW used by the UE in the non-3GPP network according to the IE indicating handover; and*

*send a create bearer request for creating a bearer to the PDN GW;*

*wherein the PDN GW is configured to create the bearer.*

*14. The communication system of claim 13, wherein the MME is configured to identify the PDN GW by obtaining a PDN GW address from a home subscriber server (HSS).*

* * * * *